United States Patent
Matsuoka et al.

(10) Patent No.: US 8,709,694 B2
(45) Date of Patent: Apr. 29, 2014

(54) POLYURETHANE RESIN, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

(75) Inventors: Hirotaka Matsuoka, Kanagawa (JP); Sumiaki Yamasaki, Kanagawa (JP); Yuki Sasaki, Kanagawa (JP); Satoshi Hiraoka, Kanagawa (JP); Hirofumi Shiozaki, Kanagawa (JP); Emi Miyata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/563,310

(22) Filed: Jul. 31, 2012

(65) Prior Publication Data
US 2013/0236831 A1 Sep. 12, 2013

(30) Foreign Application Priority Data
Mar. 12, 2012 (JP) ................... 2012-055102

(51) Int. Cl.
*G03G 9/087* (2006.01)

(52) U.S. Cl.
USPC ..................... 430/109.5; 430/123.5

(58) Field of Classification Search
USPC .............. 430/109.2, 109.5, 123.5; 528/1; 527/600, 601; 399/252
See application file for complete search history.

(56) References Cited

FOREIGN PATENT DOCUMENTS

| JP | 06-080754 | * | 3/1994 |
| JP | A-2002-72555 | | 3/2002 |
| JP | A-2003-43742 | | 2/2003 |
| JP | A-2003-287926 | | 10/2003 |
| JP | A-2007-248704 | | 9/2007 |
| JP | B2-4505738 | | 5/2010 |

OTHER PUBLICATIONS

AIPN Japanese Patent Office machine-assisted translation of JP 06-080754 (pub. Mar. 1994).*
American Chemical Society (ACS) File Registry No. 1675-54-3 on STN, copyright 2013, which was entered in STN on Nov. 16, 1984.*

* cited by examiner

*Primary Examiner* — Janis L Dote
(74) *Attorney, Agent, or Firm* — Oliff PLC

(57) ABSTRACT

A polyurethane resin which is an addition polymer, includes an isocyanate compound containing at least a compound having two or more isocyanate groups; and an alcohol compound containing rosin diol represented by Formula (1):

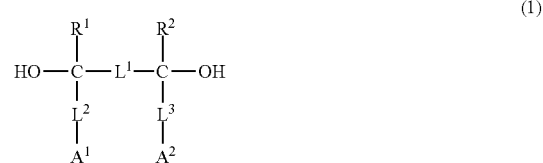

wherein in Formula (1), $R^1$ and $R^2$ represent a hydrogen atom or a methyl group, $L^1$, $L^2$, and $L^3$ each independently represent a carbonyl group, an ester group, an ether group, a sulfonyl group, a chain alkylene group which may have a substituent, a cyclic alkylene group which may have a substituent, an arylene group which may have a substituent, and a divalent linking group selected from a group consisting of combinations of the above-described groups, wherein $L^1$ and $L^2$ or $L^1$ and $L^3$ may form a ring together, and $A^1$ and $A^2$ represent a rosin ester group.

11 Claims, 2 Drawing Sheets

POLYURETHANE RESIN, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2012-055102 filed Mar. 12, 2012.

BACKGROUND

Technical Field

The present invention relates to a polyurethane resin, a toner for developing an electrostatic charge image, an electrostatic charge image developer, a toner cartridge, a process cartridge, an image forming apparatus, and an image forming method.

SUMMARY

According to an aspect of the invention, there is provided a polyurethane resin which is an addition polymer, including an isocyanate compound containing at least a compound having two or more isocyanate groups; and an alcohol compound containing rosin diol represented by Formula (1):

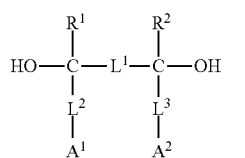

(1)

wherein in Formula (1), $R^1$ and $R^2$ represent a hydrogen atom or a methyl group, $L^1$, $L^2$, and $L^3$ each independently represent a carbonyl group, an ester group, an ether group, a sulfonyl group, a chain alkylene group which may have a substituent, a cyclic alkylene group which may have a substituent, an arylene group which may have a substituent, and a divalent linking group selected from a group consisting of combinations of the above-described groups, wherein $L^1$ and $L^2$ or $L^1$ and $L^3$ may form a ring together, and $A^1$ and $A^2$ represent a rosin ester group.

BRIEF DESCRIPTION OF THE DRAWINGS

Exemplary embodiments of the present invention will be described in detail based on the following figures, wherein.

DETAILED DESCRIPTION

Figure 1:
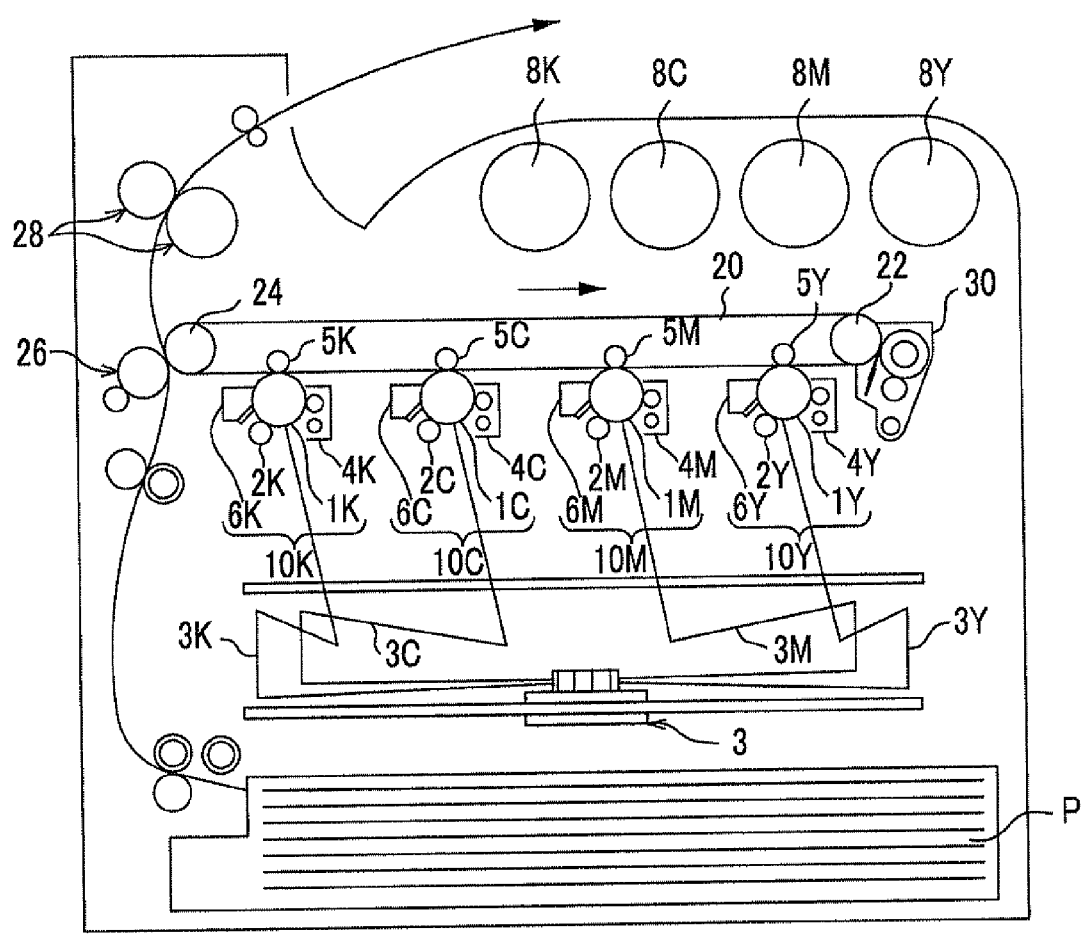
FIG. 1 is a diagram schematically illustrating a configuration example of an image forming apparatus according to an exemplary embodiment of the invention.

Hereinafter, an exemplary embodiment which is an example of the invention will be described in detail.

Polyurethane Resin for Toner

A polyurethane resin for toner according to the exemplary embodiment is an addition polymer of an isocyanate compound containing at least a compound having two or more isocyanate groups and an alcohol compound containing rosin dial represented by Formula (1).

In this case, the polyurethane resin has a urethane bond or a urea bond as a binding element and the intermolecular cohesive force thereof is 8.74 kcal/mol.

On the other hand, the intermolecular cohesive forces of resins having a methylene bond, an ether bond, and a benzene bond are 0.68 kcal/mol, 1.0 kcal/mol, 3.9 kcal/mol, and 2.9 kcal/mol, respectively. Therefore, it is considered that the resin having a urethane bond or a urea bond as a binding element is a highly crystalline resin which has a significantly higher intermolecular cohesive force than the others and has a tendency where the glass transition temperature increases.

Therefore, it is considered that a toner containing polyurethane resin has a tendency where the glass transition temperature increases even when the softening temperature is reduced due to the reduction in the molecular weight of polyurethane resin; and as a result, offset resistance is exhibited.

On the other hand, it is considered that a toner containing polyurethane resin has a tendency to suppress the fix level of an image fixed on a recording medium because polyurethane resin is easily hydrolyzed.

Therefore, the polyurethane resin for toner according to the exemplary embodiment includes an alcohol compound containing rosin diol represented by Formula (1) as a component for addition polymerization. As a result, the fix level of an image fixed on a recording medium is improved.

The reason is not clear but considered to be as follows.

The rosin diol represented by Formula (1) below has a rosin ester group which is rigid and hydrophobic.

That is, it is considered that the polyurethane resin for toner according to the exemplary embodiment has a rosin skeleton, which is rigid and hydrophobic, in a side chain thereof; an addition-polymerized site of the main chain has a tendency not to be easily exposed to water due to the rosin skeleton; and as a result, polyurethane resin which is rigid and not easily hydrolyzed is obtained.

As a result, the polyurethane resin for toner according to the exemplary embodiment has a tendency to have high strength. Therefore, when a toner for developing an electrostatic charge image contains the polyurethane resin for toner according to the exemplary embodiment, the fix level of an image fixed on a recording medium is improved.

Accordingly, the polyurethane resin for toner according to the exemplary embodiment realizes a toner in which the fix level of an image fixed on a recording medium is improved while offset resistance is maintained.

Hereinafter, the polyurethane resin for toner according to the exemplary embodiment will be described in detail.

The polyurethane resin for toner according to the exemplary embodiment is an addition polymer of an isocyanate compound containing a compound having two or more isocyanate groups and an alcohol compound containing rosin diol represented by Formula (1) below.

In this case, the weight ratio of the isocyanate compound and the alcohol compound (Isocyanate Compound/Alcohol Compound) is preferably from 100/150 to 150/100, more preferably from 100/120 to 120/100, and still more preferably from 100/110 to 110/100.

First, the alcohol compound will be described.

Alcohol Compound

The alcohol compound contains rosin diol represented by Formula (1) below.

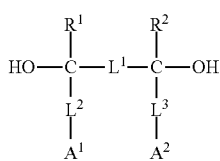

(1)

In Formula (1), $R^1$ and $R^2$ represent a hydrogen atom or a methyl group. $L^1$, $L^2$, and $L^3$ each independently represent a carbonyl group, an ester group, an ether group, a sulfonyl group, a chain alkylene group which may have a substituent, a cyclic alkylene group which may have a substituent, an arylene group which may have a substituent, and a divalent linking group selected from a group consisting of combinations of the above-described groups, wherein $L^1$ and $L^2$ or $L^1$ and $L^3$ may form a ring together. $A^1$ and $A^2$ represent a rosin ester group.)

hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, cyclopentyl group, a cyclohexyl group, and a phenyl group.

The rosin diol represented by Formula (1) contains two rosin ester groups in a single molecule.

In the exemplary embodiment, the rosin ester group represents a residue in which a hydrogen atom is excluded from a carboxyl group included in rosin.

The rosin diol represented by Formula (1) may be synthesized in a well-known method and, for example, is synthesized by a reaction of a bifunctional epoxy compound and rosin.

Hereinafter, an example of a synthesis scheme of the rosin diol is shown.

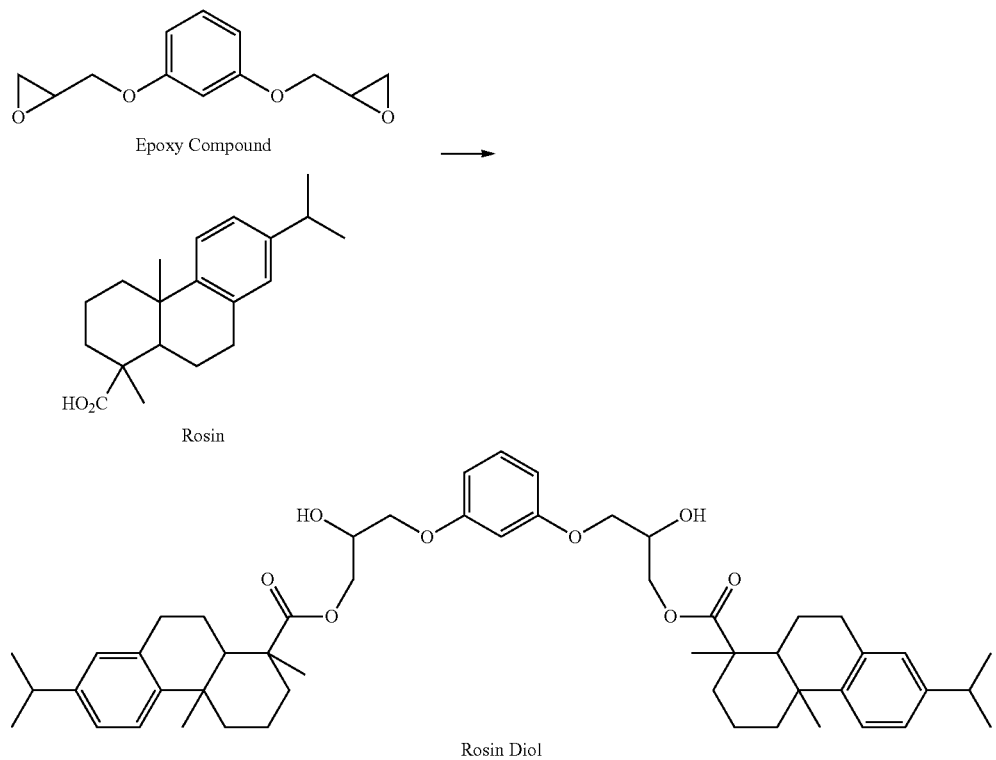

Examples of chain alkylene groups represented by $L^1$, $L^2$, and $L^3$ include alkylene groups having from 1 to 10 carbon atoms.

Examples of cyclic alkylene groups represented by $L^1$, $L^2$, and $L^3$ include cyclic alkylene groups having from 3 to 7 carbon atoms.

Examples of arylene groups represented by $L^1$, $L^2$, and $L^3$ include a phenylene group, a naphthylene group, and an anthracene group.

Examples of a substituent of the chain alkylene groups, the cyclic alkylene groups, and the arylene groups include an alkyl group having from 1 to 8 carbon atoms and an aryl group, and a linear, branched, or cyclic alkyl group is preferable. Specific examples thereof include a methyl group, an ethyl group, a propyl group, a butyl group, a pentyl group, a The bifunctional epoxy compound contains two epoxy groups in a single molecule, and examples thereof include diglycidyl ether of aromatic diol, diglycidyl ether of aromatic dicarboxylic acid, diglycidyl ether of aliphatic diol, diglycidyl ether of alicyclic diol, and alicyclic epoxide.

Representative examples of diglycidyl ether of aromatic diol include, as an aromatic diol component, bisphenol A and bisphenol A derivatives such as polyalkyleneoxide adducts of bisphenol A; bisphenol F and bisphenol F derivatives such as polyalkyleneoxide adducts of bisphenol F; bisphenol S and bisphenol S derivatives such as polyalkyleneoxide adducts of bisphenol S; resorcinol; t-butylcatechol; and biphenol.

Representative examples of diglycidyl ether of aromatic dicarboxylic acid include, as an aromatic dicarboxylic acid component, terephthalic acid, isophthalic acid, and phthalic acid.

Representative examples of diglycidyl ether of aliphatic diol include, as an aliphatic diol component, ethylene glycol, 1,2-propanediol, 1,3-propanediol, 1,4-butanediol, 1,5-pentanediol, 1,6-hexanediol, neopentylglycol, 1,9-nonanediol, diethylene glycol, triethylene glycol, polyethylene glycol, polypropylene glycol, and polytetramethylene glycol.

Representative examples of diglycidyl ether of alicyclic diol include, as an alicyclic diol component, hydrogenated bisphenol A, hydrogenated bisphenol A derivatives such as polyalkyleneoxide adducts of hydrogenated bisphenol. A, and cyclohexanedimethanol.

A representative example of alicyclic epoxide includes limonene dioxide.

A compound containing the epoxy group is obtained by a reaction of a diol component and epihalohydrin, but, depending on the amount ratio thereof, may be a polymer obtained by polycondensation thereof.

The reaction of rosin and the bifunctional epoxy compound proceeds through a ring-opening reaction of a carboxylic group of rosin and an epoxy group of the bifunctional epoxy compound. At this time, the reaction temperature is preferably equal to or higher than the melting temperatures of both components or is preferably a temperature at which both components may be mixed, specifically, from 60° C. to 200° C. in general. During the reaction, a catalyst which promotes the ring-opening reaction of an epoxy group may be added.

Examples of the catalyst include amines such as ethylenediamine, trimethylamine, and 2-methylimidazole; quarternary ammonium salt such as triethylammonium bromide, triethylammonium chloride, and butyltrimethylammonium chloride; and triphenylphosphine.

The reaction may be carried out in various ways. For example, when a batch method is used, in general, rosin and the bifunctional epoxy compound are put into a flask which has a heating function and is equipped with a cooling pipe, a stirring device, an inert gas inlet port, a thermometer, and the like, followed by heating and melting. Then, a reactant is sampled for following the progress of the reaction. The progress of the reaction is examined by checking the reduction in acid value, and the reaction is finished when it reaches or approaches the stoichiometric end point.

The reaction ratio of rosin and the bifunctional epoxy compound is not particularly limited. However, regarding the mole ratio of rosin and the bifunctional epoxy compound, it is preferable that 1.5 moles to 2.5 moles of rosin be reacted with 1 mole of the bifunctional epoxy compound.

Rosin used in the exemplary embodiment is a collective term of resin acids obtained from trees and the main component thereof is natural products including abietic acid, which is a kind of tricyclic diterpenes, and isomers thereof. Specific examples of components of rosin include, in addition to abietic acid, palustric acid, neoabietic acid, pimaric acid, dehydroabietic acid, isopimaric acid, and sandaracopimaric acid. Rosin used in the exemplary embodiment is a mixture of the above materials.

When classified based on the collection method, rosins are broadly divided into three kinds of tall rosin made from pulp, gum rosin made from crude turpentine, and wood rosin made from pine stump. As rosin used in the exemplary embodiment, gum rosin and/or tall rosin is preferable from the viewpoint of availability.

It is preferable that these rosins be purified. From unpurified rosins, a polymer, which is considered to originate from a peroxide of a resin acid, or non-saponification matter, which is included in unpurified rosins, is removed. As a result, purified rosin is obtained. The purification method is not particularly limited and well-known purification methods are used, for example. Specifically, distillation, recrystallization, extraction, and the like are used. Industrially, distillation is preferable for purification. In general, distillation conditions are selected at a temperature of 200° C. to 300° C. and at a pressure of 6.67 kPa or less in consideration of distillation time. Recrystallization is performed, for example, by dissolving unpurified rosin in a good solvent, removing the solvent by filtration to obtain a thick solution, and adding the thick solution to a poor solvent. Examples of the good solvent include aromatic hydrocarbons such as benzene, toluene, and xylene; chlorinated hydrocarbons such as chloroform; alcohols such as lower alcohol; ketones such as acetone; acetic acid esters such as ethyl acetate. Examples of the poor solvent include hydrocarbon solvents such as n-hexane, n-heptane, cyclohexane, and isooctane. Extraction is a method of obtaining purified rosin by dissolving unpurified rosin in alkali water to obtain an aqueous alkali solution, extracting insoluble non-saponification matter from the aqueous alkali solution with an organic solvent, and neutralizing the water layer.

Disproportionated rosin may be used. Disproportionated rosin is obtained by heating rosin including abietic acid as a main component at high temperature in the presence of a disproportionation catalyst to eliminate an unstable conjugated double bond in the molecule. The main component thereof is a mixture of dehydroabietic acid and dihydroabietic acid.

Examples of the disproportionation catalyst include various well-known catalysts, for example, supported catalysts such as palladium on carbon, rhodium on carbon, and platinum on carbon; powder of metal such as nickel or platinum; iodine; and iodides such as iron iodide.

In addition, hydrogenated rosin may be used in order to eliminate an unstable conjugated double bond in the molecule. In a hydrogenation reaction, for example, well-known hydrogenation reaction conditions are adopted. That is, rosin is heated in the presence of a hydrogenation catalyst under hydrogen pressure. Examples of the hydrogenation catalyst include various well-known catalysts, for example, supported catalysts such as palladium on carbon, rhodium on carbon, and platinum on carbon; powder of metal such as nickel or platinum; iodine; and iodides such as iron iodide.

During the preparation of the disproportionation rosin or the hydrogenated rosin, the above-described purification process may be provided before or after a disproportionation treatment or a hydrogenation treatment.

Hereinafter, exemplary compounds of a specific rosin diol which is preferably used in the exemplary embodiment are shown, but the rosin diol in the exemplary embodiment is not limited thereto.

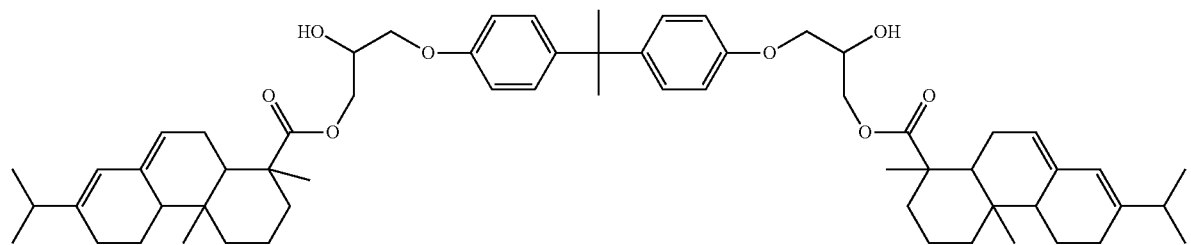
(1)
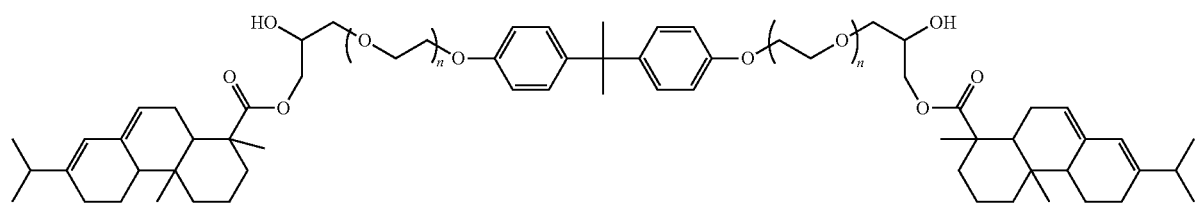
(2)
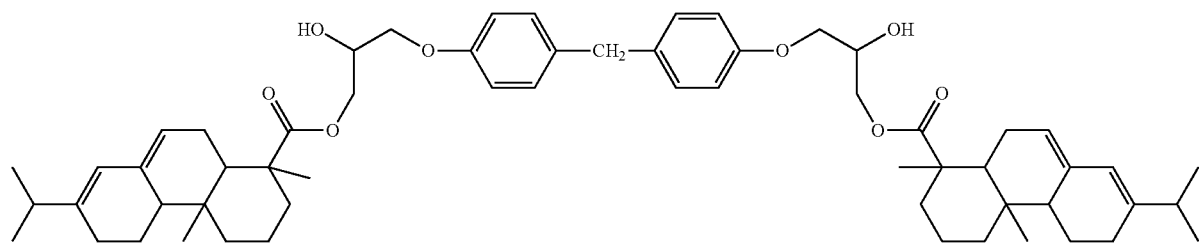
(3)
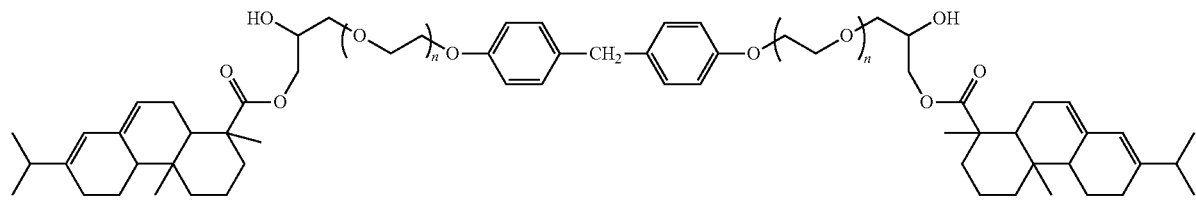
(4)
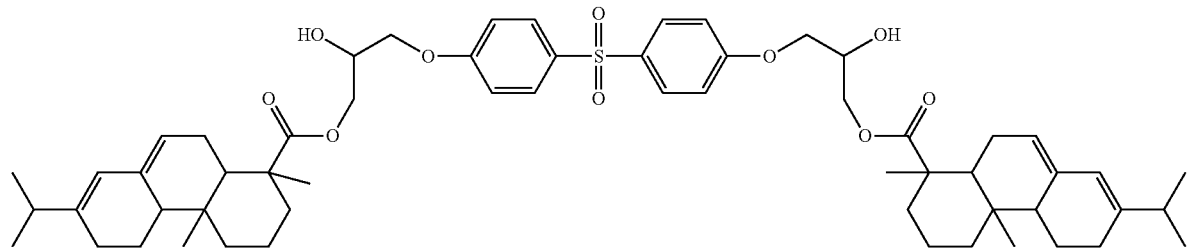
(5)
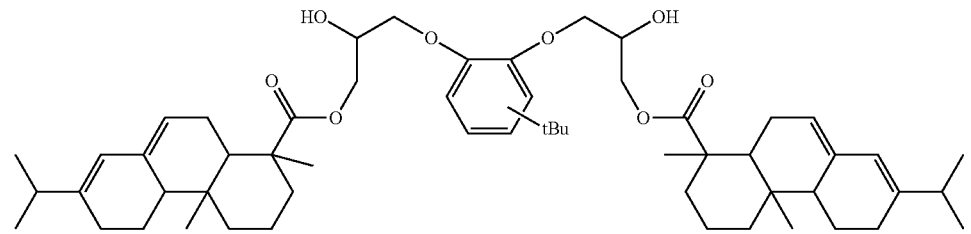
(6)

-continued
(7)
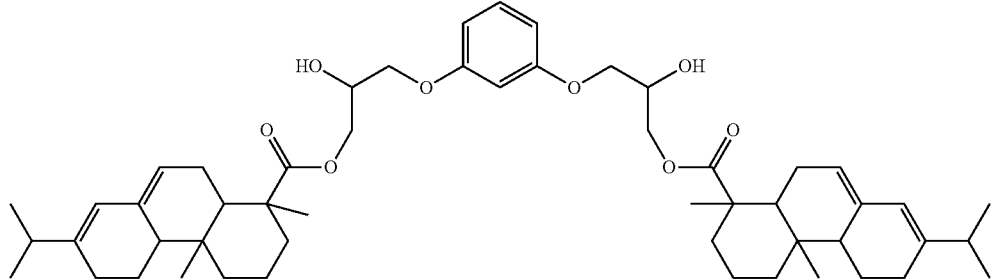
(8)
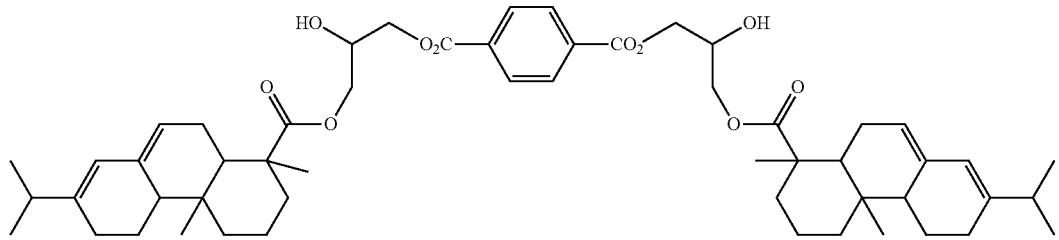
(9)
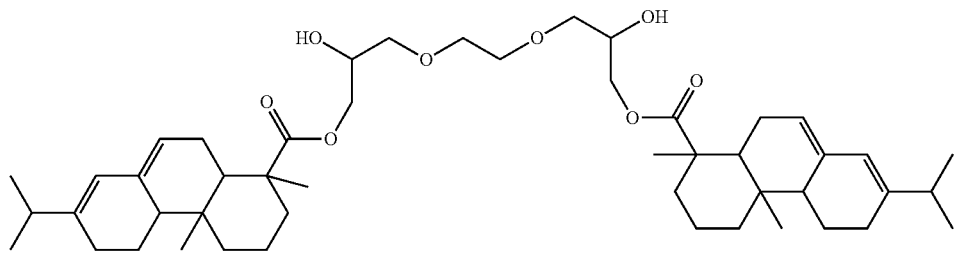
(10)
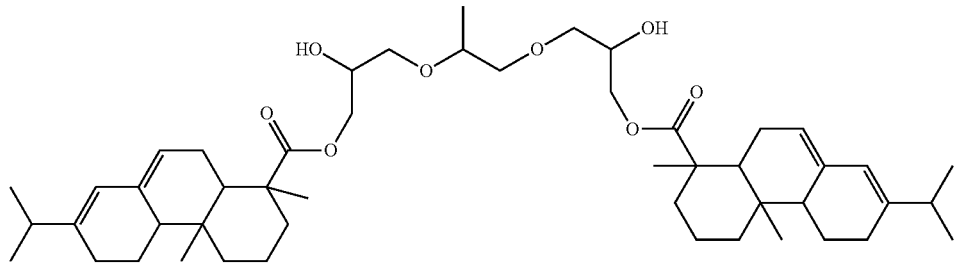
(12)
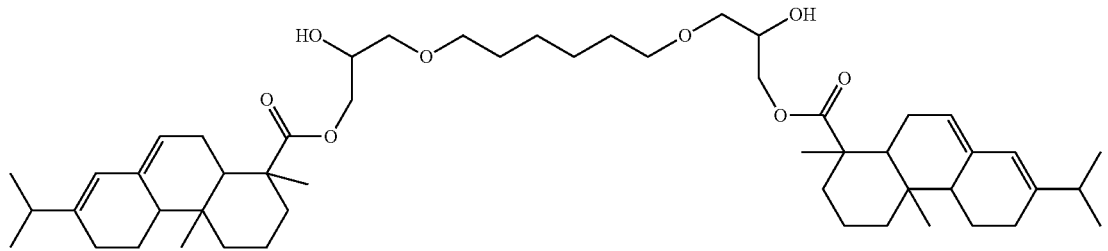
(13)
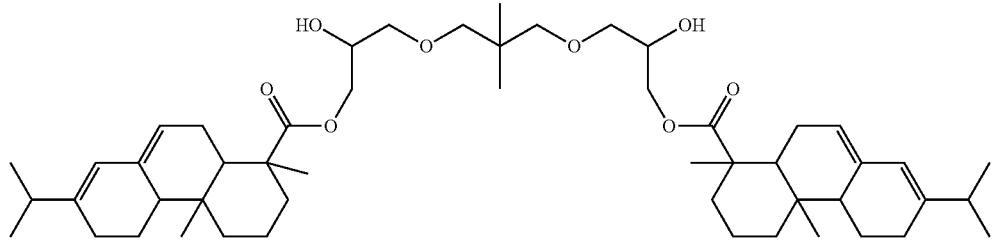

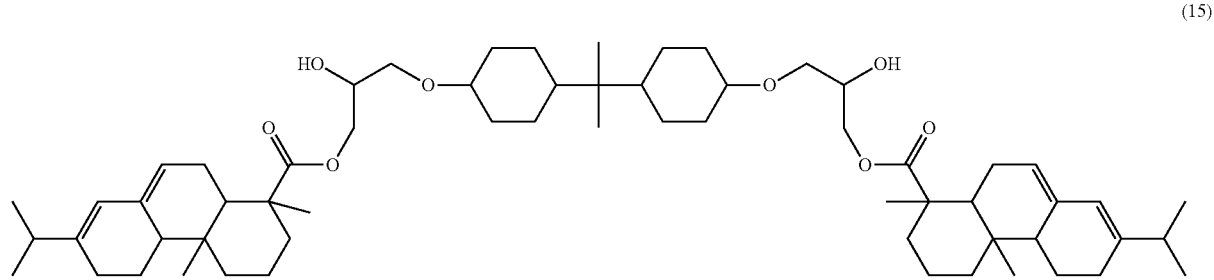
(14)
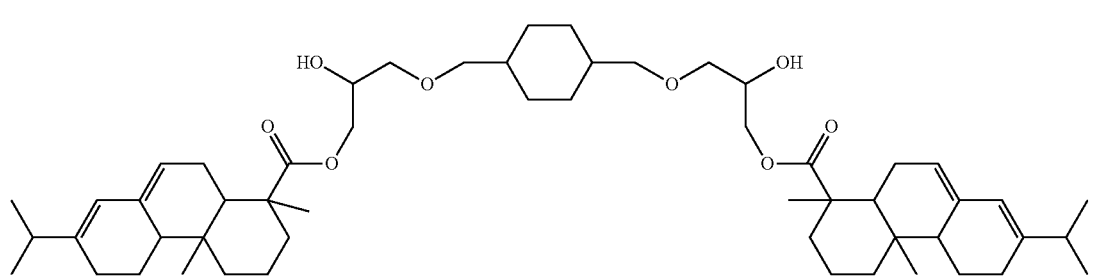
(15)
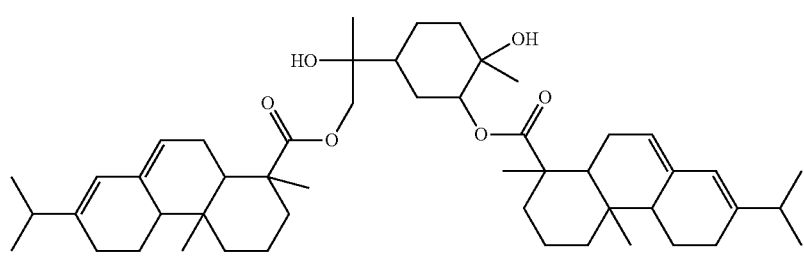
(16)
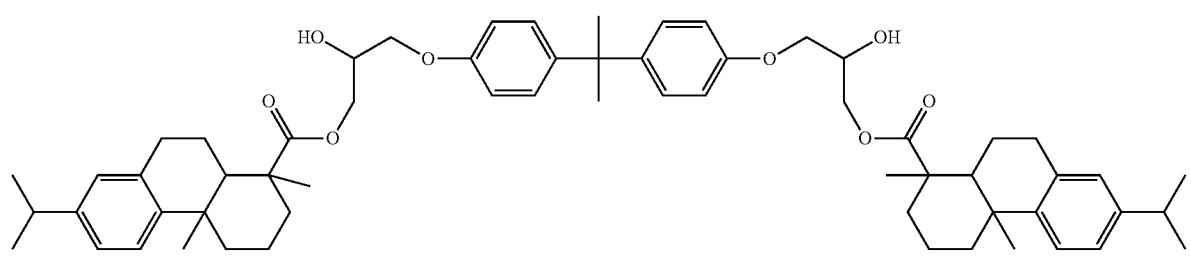
(17)
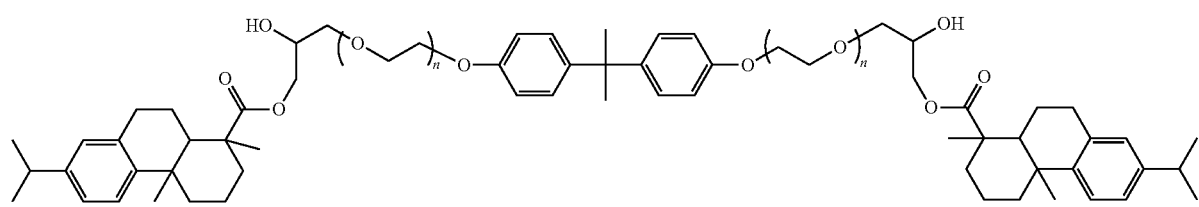
(18)
(19)

-continued
(20)
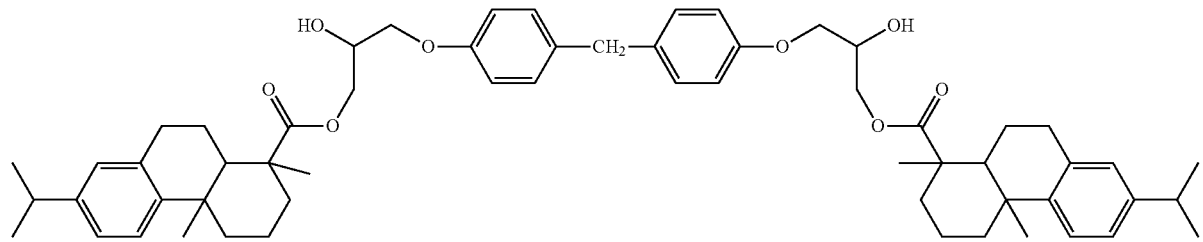
(21)
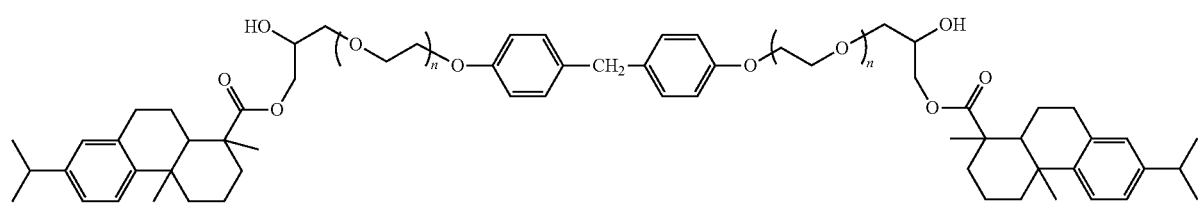
(22)
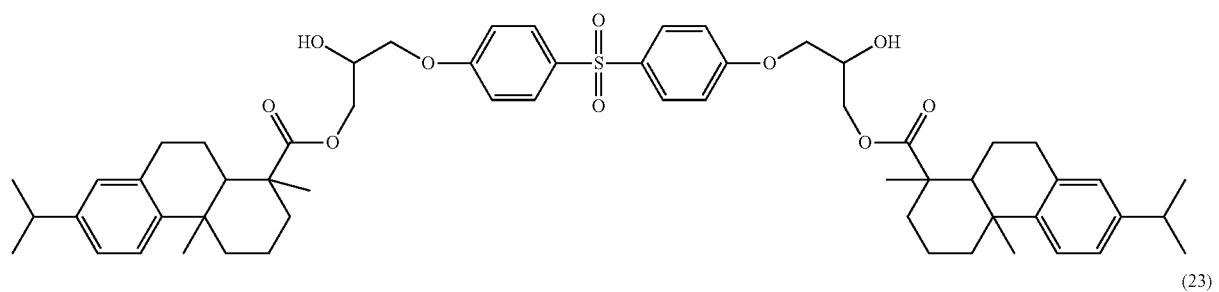
(23)
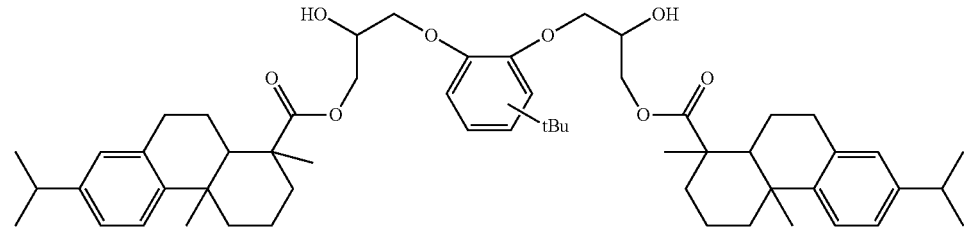
(24)
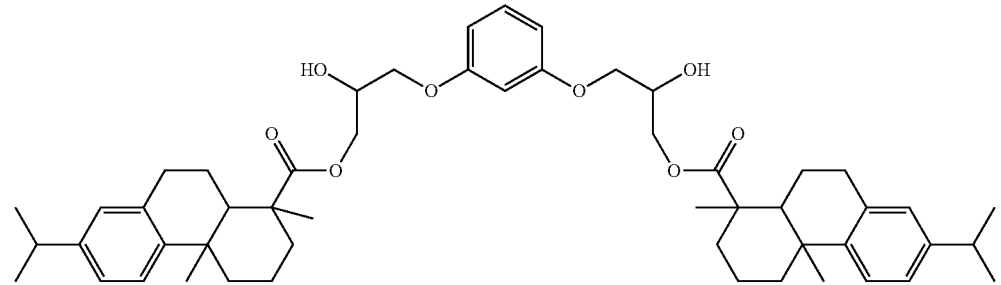
(25)
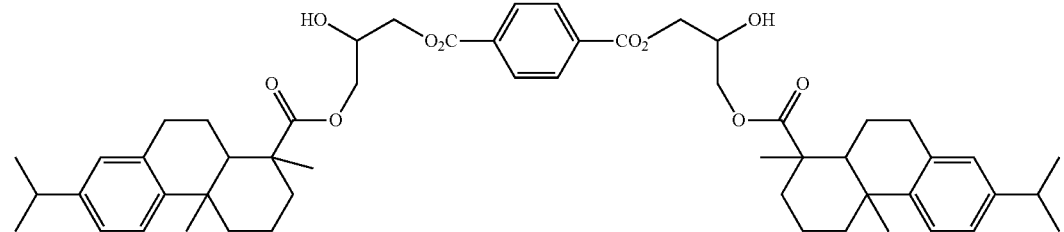

(26)
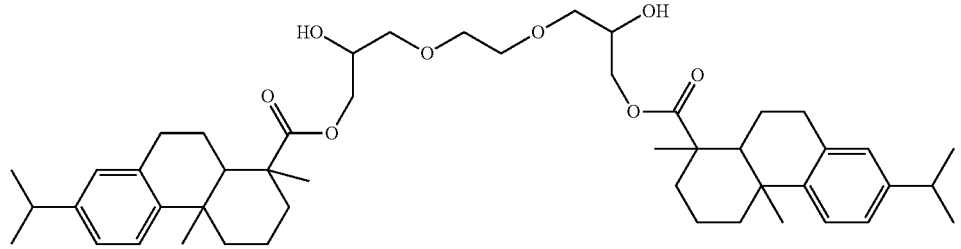
(27)
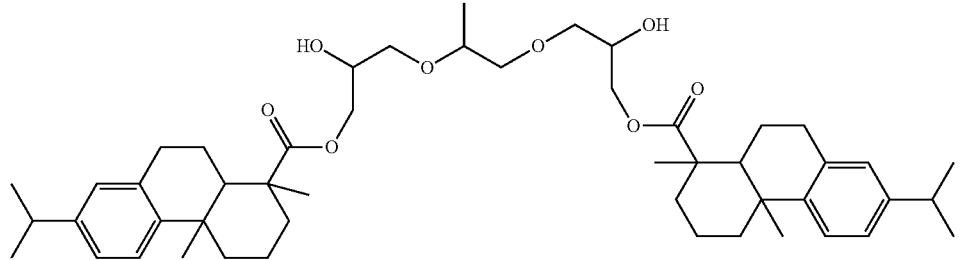
(28)
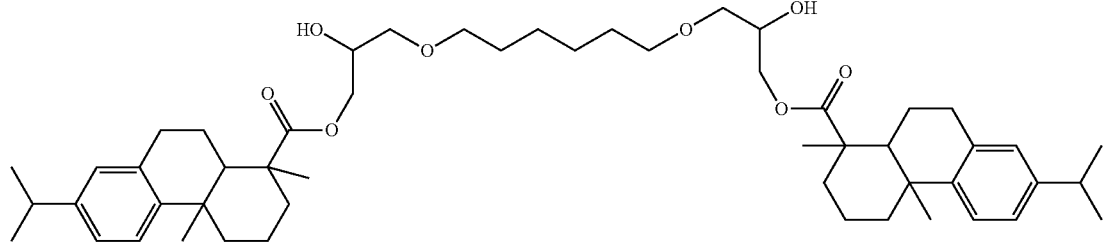
(29)
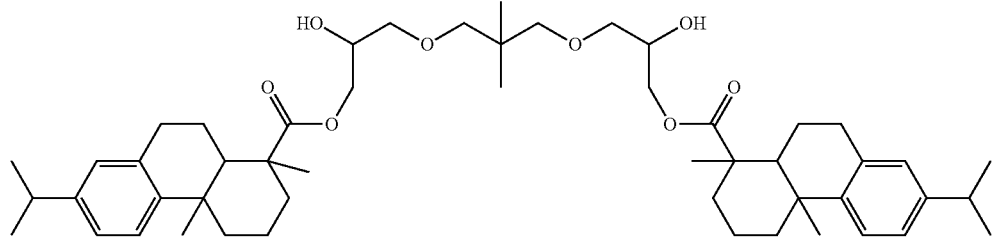
(30)
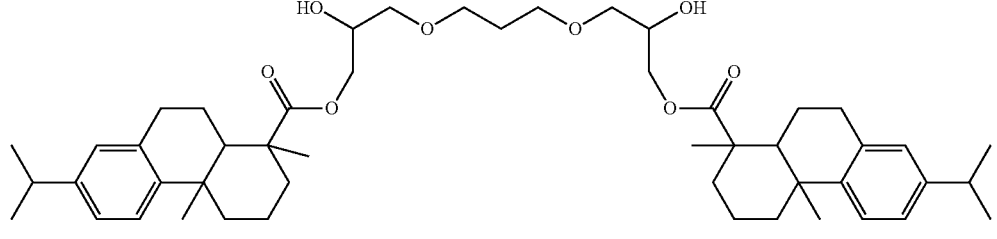
(31)
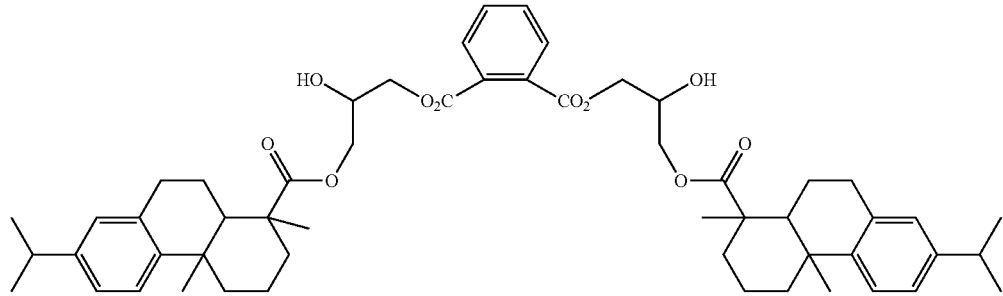

-continued
(32)
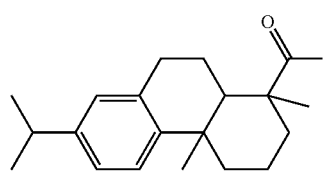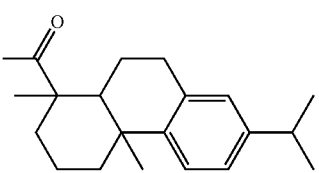
(33)
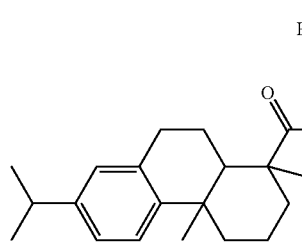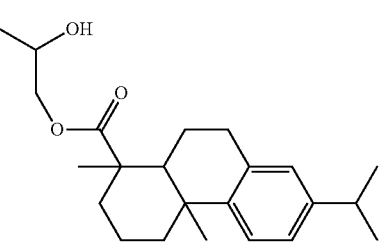
(34)
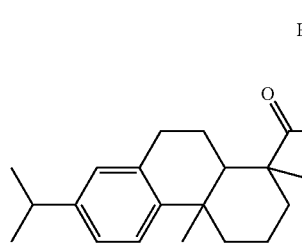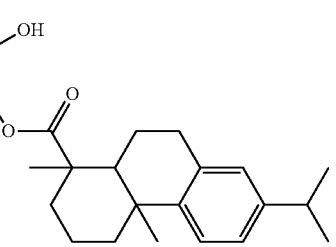
(35)
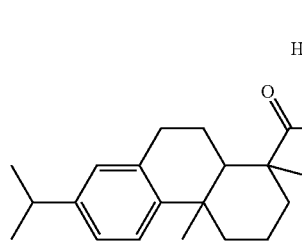
(36)
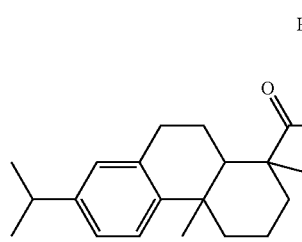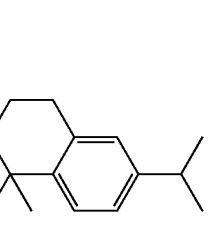
(37)
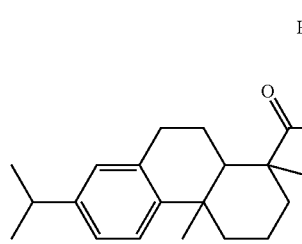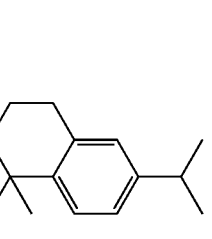

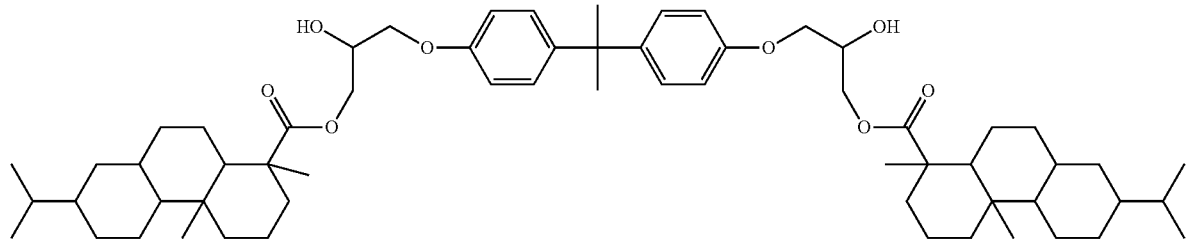

(38)

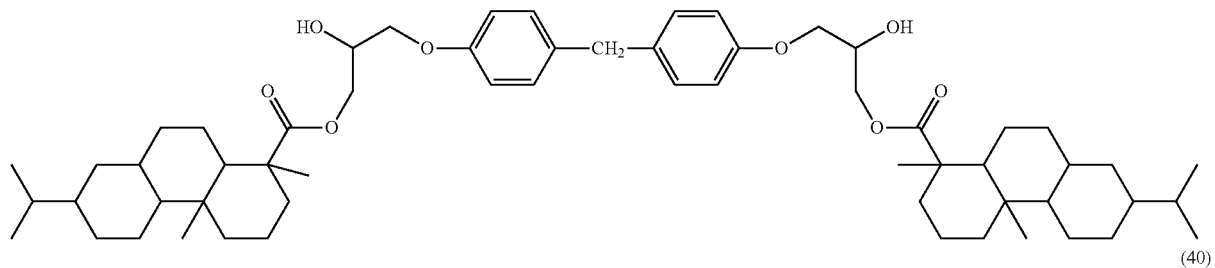

(39)

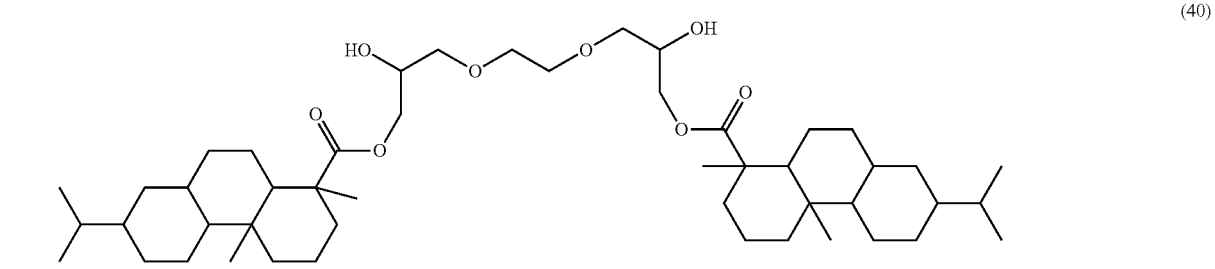

(40)

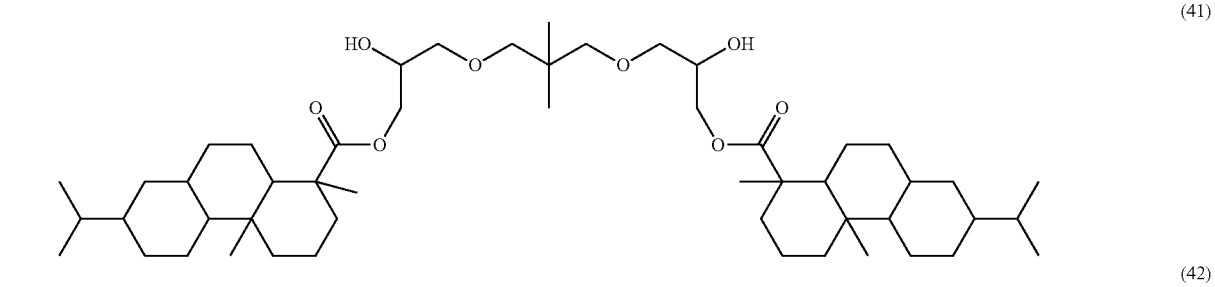

(41)

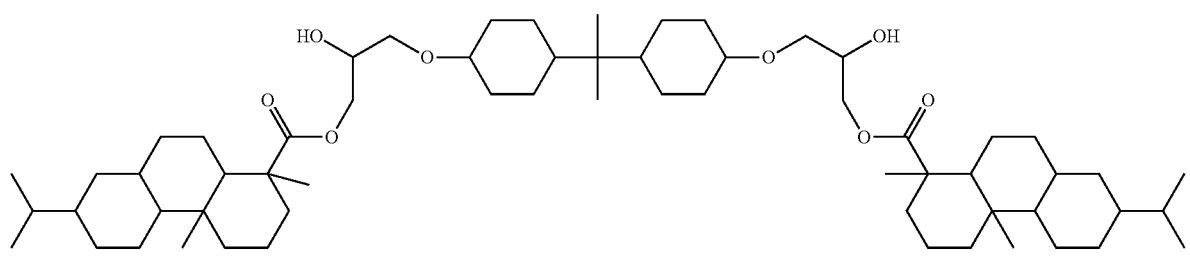

(42)

In the exemplary compounds of the specific rosin diol, n represents an integer of 1 or more.

In the exemplary embodiment, as an alcohol compound, rosin dial may be used in combination with other alcohols. The content of the rosin dial according to the exemplary embodiment in the alcohol component is preferably from 1% by weight to 80% by weight, more preferably from 5% by weight to 80% by weight, and still more preferably from 10% by weight to 80% by weight, from the viewpoint of improving a fix level.

As alcohols other than the rosin diol, at least one member selected from a group consisting of aliphatic dials and aromatic diols may be used in a range that does not impair toner performance.

Specifically, examples of the aliphatic dials include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentylglycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5- pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, dimer diol, 3-hydroxy-2,2-dimethylpropyl-3-hydroxy-2,2-dimethyl propanoate, diethylene glycol, triethylene glycol, polyethylene glycol, dipropylene glycol, and polypropylene glycol, but the aliphatic diols are not limited to these examples.

Examples of the aromatic dials include ethylene oxide adducts of bisphenol A, propylene oxide adducts of bisphenol A, and butylene oxide adducts of bisphenol A, but the aromatic diols are not limited to these examples.

These may be used alone or in a combination of two or more kinds thereof.

Isocyanate Compound

The isocyanate compound contains at least a compound having two or more isocyanate groups (hereinafter, referred to as the polyisocyanate compound).

Examples of the polyisocyanate compound include a diisocyanate compound and a triisocyanate compound and examples of the diisocyanate compound include an aliphatic diisocyanate compound and an aromatic diisocyanate compound.

Examples of the aliphatic diisocyanate compound include an acyclic chain aliphatic diisocyanate compound (hereinafter, referred to as the chain aliphatic diisocyanate compound) and a cyclic aliphatic diisocyanate compound (hereinafter, referred to as the alicyclic diisocyanate compound).

Examples of the chain aliphatic diisocyanate compound include ethane diisocyanate, propane diisocyanate, butene diisocyanate, butane diisocyanate, hexamethylene diisocyanate, thiodiethyl diisocyanate, pentane diisocyanate, β-methylbutane diisocyanate, hexane diisocyanate, ω,ω'-dipropyl ether diisocyanate, thiodipropyl diisocyanate, heptane diisocyanate, 2,2-dimethylpentane diisocyanate, 3-methoxyhexane diisocyanate, octane diisocyanate, 2,2,4-trimethylpentane diisocyanate, nonane diisocyanate, decane diisocyanate, 3-butoxyhexane diisocyanate, 1,4-butylene glycol-dipropyl ether-ω,ω'-diisocyanate, undecane diisocyanate, dodecane diisocyanate, and thiodihexyl diisocyanate.

The chain aliphatic diisocyanate compound preferably has from 4 to 30 carbon atoms, and examples thereof include tetramethylene diisocyanate, 1,5-pentamethylene diisocyanate, 1,6-hexamethylene diisocyanate, 2,2,4 (or 2,4,4)-trimethyl-1,6-hexamethylene diisocyanate, and lysine isocyanate. Hexamethylene diisocyanate is preferable from the viewpoint of industrial availability.

Since polyurethane resin using the chain aliphatic diisocyanate compound is improved in flexibility, it is considered to exhibit an improved low-temperature fixing property when used for toner.

Examples of the chain alicyclic diisocyanate compound include ω,ω'-dimethylcyclohexane diisocyanate, ω,ω'-1,4-dimethylcyclohexane diisocyanate, and 3,5-dimethylcyclohexane-1-methyl isocyanate-2-propyl isocyanate.

Examples of the alicyclic diisocyanate compound include an alicyclic diisocyanate compound having a single alicyclic hydrocarbon and an alicyclic diisocyanate compound in which plural alicyclic hydrocarbons are bonded to two isocyanate groups directly or through an alkylene group.

Specific examples of the alicyclic diisocyanate compound having a single alicyclic hydrocarbon include isophrone diisocyanate, ω,ω'-1,2-dimethylcyclohexane diisocyanate, ω,ω'-dimethylcyclohexane diisocyanate, 3,5-dimethylcyclohexane-1-methyl isocyanate-2-propyl isocyanate, hydrogenated xylene diisocyanate, hydrogenated diphenyl methane diisocyanate, 1,4-diisocyanate cyclohexane, 1,3-bis(diisocyanate methyl)cyclohexane, and 4,4'-dicyclohexylmethane diisocyanate.

Among these, isophorone diisocyanate represented by Structural Formula (I) below is preferable.

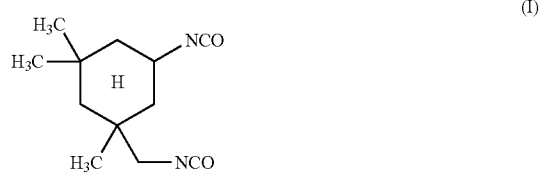

(I)

In addition, the alicyclic diisocyanate compound in which plural alicyclic hydrocarbons are bonded to two isocyanate groups directly or through an alkylene group is a compound represented by Formula (2) below, for example.

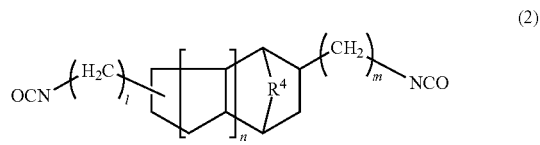

(2)

In Formula (2) above, $R^4$ represents a single bond or a group selected from a group consisting of a methylene group, an ethylene group, and a —C(CH$_3$)$_2$— group.

l and m each independently represent an integer of from 1 to 5 and n represents an integer of from 0 to 2.

Among alicyclic diisocyanate compounds represented by Formula (2) above, norbornane diisocyanate represented by Structural Formula (II) below is preferable, for example.

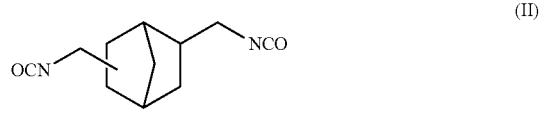

(II)

When the alicyclic diisocyanate compound is used for toner, light fastness is satisfactory and image discoloration does not occur after storage for a long-period of time.

The reason is considered to be that the alicyclic diisocyanate compound has an alicyclic hydrocarbon and thus deterioration due to light or heat is suppressed.

In addition, resin obtained by using the alicyclic diisocyanate compound is hydrophobic and not easily hydrolyzed and thus is improved in the productivity when toner is prepared using a wet process.

In addition, since a hard polyurethane resin is obtained, the fix level of an image fixed on a recording medium is improved when the polyurethane resin is used for toner.

Examples of the aromatic diisocyanate compound include 1,3-phenylene diisocyanate, 1,4-phenylene diisocyanate, 1-methylbenzene-2,4-diisocyanate, 1-methylbenzene-2,5-diisocyanate, 1-methylbenzene-3,5-diisocyanate, 1,3-dimethylbenzene-2,4-diisocyanate, 1,3-dimethylbenzene-4,6-diisocyanate, 1,4-dimethylbenzene-2,5-diisocyanate, 1-ethylbenzene-2,4-diisocyanate, 1-isopropylbenzene-2,4-diisocyanate, diethylbenzene diisocyanate, and diisopropylbenzene diisocyanate.

As the aromatic diisocyanate compound, an aromatic diisocyanate compound represented by Formula (3) having a basic structure in which two aromatic hydrocarbons are bonded through an alkylene group.

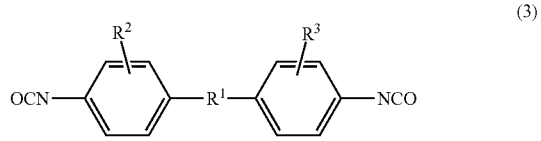

In Formula (3), $R^1$ represents an alkylene group selected from a group consisting of a methylene group, an ethylene group, and a —C(CH$_3$)$_2$ group.

$R^2$ and $R^3$ each independently represents a group selected from a group consisting of an alkyl group having 4 or less carbon atoms, an alkoxy group, and a halogen group.

Specific examples of the aromatic diisocyanate compound represented by Formula (3) include diphenylmethane-4,4'-diisocyanate (MDI), 2,2'-dimethyl diphenylmethane-4,4'-diisocyanate, 2,2',5,5'-tetramethyl diphenylmethane-4,4'-diisocyanate, 3,3'-dimethoxy diphenylmethane-4,4'-diisocyanate, 2,2'-dimethyl-5,5'-dimethoxy diphenylmethane-4,4'-diisocyanate, 3,3'-dichlorodiphenylmethane-4,4'-diisocyanate, α,β-diphenylethane-4,4'-diisocyanate, and derivatives thereof. In addition, a mixture of polyisocyanates thereof is preferable.

It is considered that polyurethane resin, which uses the aromatic diisocyanate compound represented by Formula (3) as a hard segment, has a hard structure in which the flexibility of a molecular chain is reduced; and thus is not easily hydrolyzed.

As a result, when the polyurethane resin is used for toner, the fix level of an image is improved.

Furthermore, polyurethane resin using the aromatic diisocyanate compound represented by Formula (3) has a satisfactory pulverizability and thus has improved productivity in a pulverizing process when prepared as toner.

In addition to the aromatic diisocyanate compound represented by Formula (3), examples of the aromatic diisocyanate compound having two aromatic hydrocarbons include a naphthalene diisocyanate compound and a biphenyl diisocyanate compound.

Examples of the naphthalene diisocyanate compound include naphthalene-1,4-diisocyanate, naphthalene-1,5-diisocyanate, naphthalene-2,6-diisocyanate, naphthalene-2,7-diisocyanate, and 1,1'-dinaphthyl-2,2'-diisocyanate.

Examples of the biphenyl diisocyanate compound include biphenyl-2,4'-diisocyanate, biphenyl-4,4'-diisocyanate, 3,3'-dimethyl biphenyl-4,4'-diisocyanate, 3,3'-dimethoxy biphenyl-4,4'-diisocyanate, and 2-nitrobiphenyl-4,4'-diisocyanate.

In addition, examples of an aromatic diisocyanate compound having three or more aromatic hydrocarbons include 3-nitrotriphenylmethane-4,4'-diisocyanate, 4-nitrotriphenylmethane-4,4'-diisocyanate, and derivatives thereof.

Examples of a triisocyanate compound having three isocyanate groups include 1-methylbenzene-2,4,6-triisocyanate, 1,3,5-trimethylbenzene-2,4,6-triisocyanate, naphthalene-1,3,7-triisocyanate, biphenyl-1,3,7-triisocyanate, diphenylmethane-2,4,4'-triisocyanate, 3-methyl diphenylmethane-4,6,4'-triisocyanate, triphenylmethane-4,4',4''-triisocyanate, diphenyl-44'-diisocyanate carbamic chloride, and derivatives thereof.

As the polyurethane resin for toner according to the exemplary embodiment, for example, the alicyclic diisocyanate compound and the aromatic diisocyanate compound are particularly preferable from the viewpoints of hydrolyzability in the stage of toner preparation and the fix level of an image fixed on a recording medium.

Among the alicyclic diisocyanate compounds, isophorone diisocyanate (IPDI), norbornane diisocyanate (NBDI), 1,3-bis(isocyanatomethyl)cyclohexane (hydrogenated XDI), and dicyclohexylmethane-4,4'-diisocyanate (hydrogenated MDI) are more preferable.

Among the aromatic diisocyanate compounds, diphenylmethane-4,4'-diisocyanate (MDI), p-xylylene diisocyanate, m-xylylene diisocyanate (XDI), p-phenylene diisocyanate, p-tetramethyl xylylene diisocyanate, m-tetramethyl xylylene diisocyanate, 1,5-naphthalene diisocyanate, triphenylmethane triisocyanate, and 2,4-tolylene diisocyanate (TDI) are more preferable.

In addition, these may be used as a mixture thereof.

Preparation of Polyurethane Resin for Toner

The polyurethane resin for toner according to the exemplary embodiment is prepared by performing addition polymerization of an isocyanate compound containing at least a compound having two or more isocyanate groups and an alcohol compound containing the rosin diol represented by Formula (1), which are base materials, using a well-known common preparation method. An example of the preparation method includes bulk polymerization.

Specifically, bulk polymerization may be performed at atmospheric pressure in the absence of solvent for several minutes to several hours under other conditions: the reaction ratio of the isocyanate compound and the alcohol compound (which is the ratio of the number of active hydrogen groups (hydroxyl groups) in the alcohol compound to the number of isocyanate groups in the isocyanate compound (the ratio represented by NCO/Active Hydrogen (Equivalent Ratio)) is from 0.5 to 1.0 and preferably from 0.7 to 1.0; and the temperature is from 30° C. to 180° C. and preferably from 30° C. to 140° C.

Examples of a catalyst include dibutyl tin dichloride, dimethyl tin dichloride, tin octylate, triphenyl ammonium dichloride, triethylamine, N,N-dimethyl cyclohexyl amine, triethylenediamine, dimethylaminoethanol, dioctyl tin dilaurate, dioctyl tin dineodecanoate, and dibutyl tin bis(mercapto acid ester).

A reaction of the isocyanate compound and the alcohol compound may be performed in the absence of solvent. Therefore, a solvent is not required unlike solution polymerization and by-products are not generated unlike polycondensation reaction, thereby realizing continuous preparation with high efficiency.

When the ratio of the number of active hydrogen groups in the alcohol compound to the number of isocyanate groups in the isocyanate compound (NCO/Active Hydrogen (Equivalent Ratio)) is reduced, the molecular weight of the polyurethane resin for toner according to the exemplary embodiment is reduced; in addition, when the ratio approaches the equivalence, the molecular weight is increased. Therefore, by controlling the number of moles in the reaction of the isocyanate compound, the molecular weight of the polyurethane resin for toner according to the exemplary embodiment may be easily controlled.

In addition, a chain elongating agent may be used in a range not affecting physical properties of the polyurethane resin for toner according to the exemplary embodiment.

Examples of the chain elongating agent include ethylene glycol, propylene glycol, 1,4-butanediol, bis-(β-hydroxy) benzene, and trimethylolpropane.

Properties of Polyurethane Resin for Toner

The number average molecular weight (Mn) of the polyurethane resin for toner according to the exemplary embodiment is from 1,000 to 10,000, preferably from 2,000 to 8,000, and more preferably from 3,000 to 5,000, in terms of polystyrene when measured using gel permeation chromatography (GPC).

Even when the number average molecular weight (Mn) of the polyurethane resin for toner according to the exemplary embodiment is from 1,000 to 10,000, a toner in which the fix level of an image fixed on a recording medium is improved while a low-temperature fixing property caused by the reduction in molecular weight and offset resistance are maintained, may be obtained.

It is considered that, by setting the number average molecular weight (Mn) of the polyurethane resin for toner according to the exemplary embodiment to 1,500 or greater, a low-temperature fixing property, as well as the preservability of a colorant, toner-filming resistance, offset resistance, and the fix level and the preservability of a fixed image are improved at the same time.

In addition, it is considered that, by setting the number average molecular weight (Mn) to 10,000 or less, a low-temperature fixing property is satisfactory and the polyurethane resin for toner according to the exemplary embodiment may be used alone as binder resin.

In addition, the weight average molecular weight (Mw) is from 3,000 to 300,000, preferably from 5,000 to 50,000, and more preferably from 8,000 to 20,000.

A value of Mw/Mn is from 1.5 to 20, preferably from 1.8 to 10, more preferably from 1.8 to 8, and most preferably from 1.8 to 5.

In order to improve a low-temperature fixing property and offset resistance at the same time, a method of increasing a value of Mw/Mn of the resin, that is, a method of designing the molecular weight distribution in a wide range or preparing a low-molecular weight resin and a high-molecular weight resin separately and mixing them, is adopted.

However, it is considered that, when the molecular weight distribution is designed in a wide range or a mixture is used, resin is not melted sharply; and therefore, the resin has a tendency where transparency deteriorates and, in particular, the quality of a color image deteriorates.

On the other hand, in the polyurethane resin for toner according to the exemplary embodiment, it is considered that a low-temperature fixing property and offset resistance are improved at the same time even without setting the molecular weight distribution in a wide range; a sharp melting property is realized by narrowing the molecular weight distribution; and as a result, a high-quality color image with high transparency may be obtained.

In order to measure the weight average molecular weight Mw and the number average molecular weight Mn, two of "HLC-8120 GPC, SC-8020 (manufactured by Tosoh Corporation, 6.0 mm ID×15 cm) are used and tetrahydrofuran (THF) is used as an eluent.

The test is conducted using a RI detector under the following conditions: a sample concentration of 0.5%; a flow rate of 0.6 ml/min; a sample injection amount of 10 μl; and a measurement temperature of 40° C.

In addition, a calibration curve is prepared from ten of "polystyrene standard samples, TSK standard": "A-500", "F-1", "F-10", "F-80", "F-380", "A-2500", "F-4", "F-40", "F-128", and F-700" (manufactured by Tosoh Corporation).

The softening temperature of resin is preferably from 80° C. to 160° C. and more preferably 90° C. to 150° C., from the viewpoints of a fixing property, preservability, and durability of toner.

The softening temperature is measured using a constant-load orifice-type flow tester (CFT-500, manufactured by Shimadzu Corporation) as a temperature which corresponds to a half of the height between a flow start point and a flow end point when a 1 $cm^3$-sized sample is melted and caused to flow out under conditions of a die pore diameter of 0.5 mm, a pressing load of 0.98 MPa (10 $Kg/cm^2$), and a rate of temperature rise of 1° C./min.

The glass transition temperature of the polyurethane resin for toner according to the exemplary embodiment is preferably from 35° C. to 80° C. and more preferably from 40° C. to 70° C., from the viewpoints of a fixing property, preservability, and durability of toner.

The glass transition temperature is measured using "DSC-20" (manufactured by SEICO Electronics) and 10 mg of sample is heated at a rate of temperature rise (10° c./min) for measurement.

In addition, the softening temperature and the glass transition temperature are easily adjusted by changing the compositions of base monomers, a polymerization initiator, the molecular weight, or the amount of a catalyst; or selecting the reaction conditions.

Toner for Developing Electrostatic Charge Image

A toner for developing an electrostatic charge image according to the exemplary embodiment (hereinafter, sometimes referred to as "the toner") contains the polyurethane resin for toner according to the exemplary embodiment.

Hereinafter the toner according to the exemplary embodiment will be described in detail.

The toner according to the exemplary embodiment includes toner particles and optionally, an external additive, for example.

Toner Particles

The toner particles will be described.

The toner particles include a binder resin, and optionally, a colorant, a release agent, and other external additives.

The binder resin contains the polyurethane resin for toner according to the exemplary embodiment as the main component.

The binder resin may contain another resin in a range of less than 50% by weight and in a range not impairing the characteristics of the main component.

Another binder resin may be coexist at the time of preparing the binder resin according to the exemplary embodiment, or may be kneaded after the preparation. When another resin is coexist at the time of preparing the binder resin according to the exemplary embodiment, a resin without a reactive group with polyisocyanate is preferable.

Examples of another binder resin include styrene resins which are homopolymers or copolymers containing styrene or a styrene substituent such as polystyrene, poly-α-methylstyrene, chloropolystyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic acid ester copolymer, styrene-methacrylic acid ester copolymer, styrene-acrylic acid ester-methacrylic acid ester copolymer, styrene-α-chloromethyl acrylate copolymer, and styrene-acrylonitrile-acrylic acid ester copolymer, polyester resin, epoxy resin, urethane-modified epoxy resin, silicone-modified epoxy resin, vinyl chloride resin, rosin-modified maleic acid resin, phenyl resin, polyethylene, polypropylene, ionomer resin, polyurethane resin, silicone resin, ketone resin, ethylene-ethylacrylate copolymer, xylene resin, polyvinyl butyral resin, terpene resin, phenol resin, and aliphatic or alicyclic hydrocarbon resin. The above examples may be used alone or as a mixture thereof.

A colorant used for the color toner may be a dye or a pigment, but pigment is preferable from the viewpoints of light fastness and water resistance.

Preferable examples of the colorant include well-known pigments such as Carbon Black, Aniline Black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, Quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3.

It is preferable that the content of the colorant in the toner according to the exemplary embodiment be from 1 part by weight to 30 parts by weight with respect to 100 parts by weight of the binder resin. In addition, optionally, a surface-treated colorant or a pigment dispersant may be effectively used. By selecting the kind of the colorant, yellow toner, magenta toner, cyan toner, or black toner may be obtained.

Examples of the release agent include paraffin wax such as low molecular weight polypropylene or low molecular weight polyethylene; silicone resin; rosins; rice wax; and carnauba wax. The melting temperature of the release agent is preferably from 50° C. to 100° C. and more preferably from 60° C. to 95° C. The content of the release agent in the toner is preferably from 0.5% by weight to 15% by weight and more preferably from 1.0% by weight to 12% by weight. When the content of the release agent is equal to or greater than 0.5% by weight, separation failure is prevented in the case of oil-less fixing. When the content of the release agent is equal to or less than 15% by weight, the fluidity of toner does not deteriorate and the image quality and reliability of a formed image are improved.

As other additives, for example, a charge-controlling agent is used.

As the charge-controlling agent, well-known charge-controlling agents are used, and an azo-based metal complex compound, a metal complex compound of salicylic acid, and a resin type charge-controlling agent containing a polar group may be used.

Properties of Toner Particles

The shape factor SF1 of the toner particles is preferably from 105 to 150 and more preferably from 110 to 140.

The above-described shape factor SF1 is obtained by Expression (1) below.

$$SF1 = (ML^2/A) \times (\pi/4) \times 100 \qquad \text{Expression (1)}$$

In Expression (1), ML represents the absolute maximum length of the toner particles and A represents the projection area of the toner particles.

Numerical values of SF1 are obtained by analyzing mainly a microscopic image or a scanning electron microscopic (SEM) image using an image analyzer. For example, the values may be calculated as follows. That is, an optical microscopic image of particles which are dispersed on a glass slide surface is input to a Luzex image analyzer through a video camera, maximum lengths and projection areas of 100 particles are obtained and calculation is performed using Expression (1) above, and the average values thereof are obtained as SF1. As a result, the numerical values of the SF1 are obtained.

The volume average particle size of the toner particles according to the exemplary embodiment is preferably from 1 μm to 30 μm, more preferably from 3 μm to 20 μm, and still more preferably from 5 μm to 10 μm.

The volume average particle size $D_{50v}$ is obtained as follows. The cumulative distributions of particle sizes from a smaller particle size side in terms of volume and number are drawn in a particle size range (channel) which is divided based on the particle size distribution measured using a measurement instrument such as MULTISIZER II (manufactured by Beckman Coulter, Inc.). A particle size which is an accumulated value of 16% is defined as Volume $D_{16v}$ and Number $D_{16p}$, a particle size which is an accumulated value of 50% is defined as Volume $D_{50v}$ and Number $D_{50p}$, and a particle size which is an accumulated value of 84% is defined as Volume $D_{84v}$ and Number $D_{84p}$. Using these, the volume average particle size distribution index $(GSD_v)$ is calculated according to an expression of $(D_{84v}/D_{16v})^{1/2}$.

External Additives

As the external additives, the toner particles may contain white inorganic powder in order to improve fluidity and the like. Examples of appropriate inorganic powder include powders of silica, alumina, titanium oxide, barium titanate, magnesium titanate, calcium titanate, strontium titanate, zinc oxide, silica sand, clay, mica, wollastonite, diatom earth, chromium oxide, cerium oxide, rouge, antimony trioxide, magnesium oxide, zirconium oxide, barium sulfate, barium carbonate, calcium carbonate, silicon carbide, silicon nitride, but silica powder is particularly preferable. In general, the content of the inorganic powder in the toner is from 0.01 parts by weight to 5 parts by weight and preferably from 0.01 parts by weight to 2.0 parts by weight, with respect to 100 parts by weight of the toner. In addition, the inorganic powder may be used in combination with well-known materials such as silica, titanium, resin particles (particles of polystyrene resin, PMMA resin, melamine resin, or the like), and alumina. In addition, as a cleaning activator, a metal salt of a higher fatty acid which is represented by zinc stearate or particles of a fluorine polymer may be added.

For example, the content of the external additives is preferably from 0.01 part by weight to 5 parts by weight and more preferably from 0.01 part by weight to 2.0 parts by weight, with respect to 100 parts by weight of the toner particles.

Preparation Method of Toner

Toner is obtained by preparing the toner particles and, optionally, externally adding the external additive to the toner particles.

The preparation method of the toner particles is not particularly limited, but the toner particles may be prepared by well-known methods such as a dry method (for example, a kneading and pulverizing method) and a wet method (for example, an emulsion aggregation method and a suspension polymerization method).

However, it is considered that the polyurethane resin for toner according to the exemplary embodiment is rigid and not easily hydrolyzed and thus has high strength; and as a result, when used for the toner for developing an electrostatic charge image, the polyurethane resin for toner according to the exemplary embodiment improves the fix level of an image fixed on a recording medium. Therefore, it is considered that, when the toner is prepared in a wet method, the above-described effect is further improved.

In the above-described kneading and pulverizing method, first, components of the binder resin, the colorant, the release agent, and the like are mixed, melted, and kneaded. Examples of a melt-kneading machine include a three-roll type, a single screw type, a twin screw type, and a BANBURY mixer type.

The obtained kneaded material is coarsely pulverized and finely pulverized using a pulverizer such as a MICRONIZER, ULMAX, a JET-O-MIZER, a jet mill, KRYPTRON, or a turbo mill, followed by classification with a classifier such as ELBOW-JET, MICROPLEX, or DS separator. As a result, a toner is obtained.

Specifically, the details of preparing the toner particles using an aggregation coalescence method, which is one of the wet methods, are as follows.

In the following description, a method of preparing the toner particles containing the colorant and the release agent will be described, in which use of the colorant and the release agent is optional. Of course, in addition to the colorant and the release agent, other external additives may be used.

Preparation Process of Resin Particle Dispersion

First, a resin particle dispersion in which the polyurethane resin are dispersed, a colorant particle dispersion in which particles of the colorant are dispersed, and a release agent dispersion in which particles of the release agent are dispersed, are prepared.

In this case, the resin particle dispersion is prepared by, for example, dispersing the polyurethane resin in a dispersion medium with a surfactant.

As the dispersion medium used for the resin particle dispersion, for example, an aqueous medium is used.

Examples of the aqueous medium include water such as distilled water or ion exchange water and alcohols. These may be used alone or in a combination of two or more kinds thereof.

The surfactant is not particularly limited, and examples thereof include anionic surfactants such as sulfate, sulfonate, phosphate, and soap; cationic surfactants such as amine salt and quaternary ammonium salt; and nonionic surfactants such as polyethylene glycol, alkyl phenol ethylene oxide adducts, and polyols. Among these, anionic surfactants and cationic surfactants are preferable. Nonionic surfactants may be used in combination with anionic surfactants or cationic surfactants.

The surfactant may be used alone or in a combination of two or more kinds thereof.

Regarding the resin particle dispersion, as a method of dispersing the polyurethane resin in a dispersion medium, for example, general dispersion methods using, for example, a rotary-shearing homogenizer, a ball mill having a medium, a sand mill, or a dyno mill are used. In addition, depending on the kind of resin particles used, the resin particles may be dispersed in a resin particle dispersion using, for example, a phase-transfer emulsification method.

In the phase-transfer emulsification method, a dispersion-target resin dissolves in a hydrophobic organic solvent in which the target resin is soluble, a base is added to an organic continuous phase (O-phase) for neutralization, and an aqueous medium (W-phase) is added thereto. As a result, the phase of the resin is transferred (so-called, phase transfer) from W/O to O/W and a discontinuous phase is obtained, thereby dispersing the resin in the aqueous medium in the particle form.

The volume average particle size of polyurethane resin particles dispersed in the resin particle dispersion is from 0.01 μm to 1 μm, for example, and may be from 0.08 μm to 0.8 μm or from 0.1 μm to 0.6 μm.

In this case, the volume average particle size of the resin particles is measured using a laser diffraction particle size distribution analyzer (manufactured by HORIBA, Ltd., LA-920). Hereinafter, the volume average particle size of particles is measured in the same manner unless specified otherwise.

The content of the polyurethane resin in the resin particle dispersion is from 5% by weight to 50% by weight, for example, and may be from 10% by weight to 40% by weight.

For example, in the same preparation method as that of the resin particle dispersion, the colorant dispersion and the release agent dispersion are prepared. That is, with regard to the volume average particle size of particles, the dispersion medium, the dispersion method, and the content of particles of the resin particle dispersion, the same shall be applied to colorant particles dispersed in the colorant dispersion and release agent particles dispersed in the release agent dispersion.

Aggregated Particle Forming Process

Next, the resin particle dispersion, the colorant particle dispersion, and the release agent dispersion are mixed.

Then, in the mixed dispersion, the polyurethane resin, the colorant particles, and the release agent particles are hetero-aggregated to form aggregated particles having a similar particle size to that of the desired toner particles and containing the polyurethane resin particles, the colorant particles, and the release agent particles.

Specifically, for example, a coagulant is added to the mixed dispersion, the pH value of the mixed dispersion is adjusted to be acidic (for example, a pH value of 2 to 5), a dispersion stabilizer is optionally added thereto, followed by heating to the glass transition temperature of the polyurethane resin (specifically, from (Glass Transition Temperature of Polyurethane Resin)-30° C. to (Glass Transition Temperature of Polyurethane Resin)-10° C.). As a result, particles dispersed in the mixed dispersion are aggregated and thus aggregated particles are formed.

In the aggregated particle forming process, a method may be adopted, in which the coagulant is added at room temperature (for example, 25° C.) while the mixed dispersion is stirred with a rotary-shearing homogenizer; the pH value of the mixed dispersion is adjusted to be acidic (for example, a pH value of 2 to 5); and optionally, a dispersion stabilizer is added and heating is performed in the above-described manner.

As the coagulant, a surfactant having a reverse polarity to that of a surfactant, which is used as a dispersant added to the mixed dispersion, may be used, for example, an inorganic metal salt and a divalent or more metal complex. In particular, when the metal complex is used as the coagulant, the amount of the surfactant used may be reduced and a charging property is improved.

Optionally, an additive which forms a complex with or a similar bond to a metal ion of the coagulant may be added. As such an additive, a chelating agent is preferable.

Examples of the inorganic metal salt include a metal salt such as calcium chloride, calcium nitrate, barium chloride, magnesium chloride, zinc chloride, aluminum chloride, or aluminum sulfate; and an inorganic metal salt polymer such as polyaluminum chloride, polyaluminum hydroxide, or calcium polysulfide.

As the chelating agent, a water-soluble chelating agent may be used. Examples of the chelating agent include oxycarboxylic acid such as tartaric acid, citric acid, or gluconic acid, iminodiacetic acid (IDA), nitrilotriacetic acid (NTA), and ethylenediamine tetraacetic acid (EDTA).

The addition amount of the chelating agent is from 0.01 part by weight to 5.0 parts by weight, for example, with respect to 100 parts by weight of the polyurethane resin, but may be equal to or greater than 0.1 part by weight and less than 3.0 parts by weight.

Coalescence Process

Next, the aggregated particle dispersion in which the aggregated particles are dispersed is heated to, for example, a temperature equal to or higher than the glass transition temperature of the polyurethane resin (for example, a temperature 10° C. to 30° C. higher than the glass transition temperature of the polyurethane resin). As a result, the aggregated particles are coalesced and thus the toner particles are formed.

Through the above-described processes, the toner particles are obtained.

In addition, the toner particles may be prepared through the following processes: a process in which, after obtaining aggregated particle dispersion in which the aggregated particles are dispersed, the aggregated particle dispersion and the resin particle dispersion in which polyurethane resin particles are dispersed are further mixed for performing aggregation such that the polyurethane resin particles are further attached to the surfaces of the aggregated particles to form second aggregated particles; and a process in which second aggregated particle dispersion, in which the second aggregated particles are dispersed, is heated such that the second aggregated particles are coalesced to form toner particles having a core-shell structure.

In this case, after finishing the coalescence process, the toner particles formed in a solution are treated in a washing process, a solid-liquid separation process, and a drying process which are well-known. As a result, dried toner particles are obtained.

In the washing process, from the viewpoint of a charging property, sufficient displacement washing with ion exchange water is preferable. In addition, the solid-liquid separation process is not particularly limited, but it is preferable that suction filtration, pressure filtration or the like be used from the viewpoint of productivity. Furthermore, the drying process is not particularly limited, but it is preferable that freeze-drying, flash jet drying, fluidized drying, vibration fluidized drying, or the like be used from the viewpoint of productivity.

The toner according to the exemplary embodiment is prepared by, for example, adding and mixing the external additive to the obtained dried toner particles. It is preferable that mixing be performed using a V-blender, a HENSCHEL MIXER, or a LOEDIGE MIXER. Furthermore, optionally, coarse particles of the toner may be removed using a vibration screener or an air classifier.

Electrostatic Charge Image Developer

An electrostatic charge image developer according to the exemplary embodiment contains at least the toner according to the exemplary embodiment.

The electrostatic charge image developer according to the exemplary embodiment may be a single component developer containing only the toner according to the exemplary embodiment or a two-component developer in which the toner and a carrier are mixed.

The carrier which may be used for the two-component developer is not particularly limited, and a well-known carrier may be used. For example, a resin-coated carrier which has a resin coating layer on the surface of a core material formed of magnetic metal such as iron oxide, nickel, or cobalt and magnetic oxide such as ferrite or magnetite; and a magnetic powder-dispersed carrier may be used. In addition, a resin-dispersed carrier in which a conductive material and the like are dispersed in a matrix resin may be used.

In the two-component developer, the mixing ratio (weight ratio) of the toner according to the exemplary embodiment and the carrier is preferably from 1:100 to 30:100 (toner:carrier) and more preferably from 3:100 to 20:100.

Image Forming Apparatus and Image Forming Method

Next, an image forming apparatus and an image forming method according to the exemplary embodiment will be described.

The image forming apparatus according to the exemplary embodiment includes an image holding member; a charging unit that charges a surface of the image holding member; an electrostatic charge image forming unit that forms an electrostatic charge image on the surface of the image holding member; a developing unit that contains an electrostatic charge image developer and forms a toner image by developing the electrostatic charge image using the electrostatic charge image developer; a transfer unit that transfers the toner image onto a recording medium; and a fixing unit that fixes the toner image on the recording medium. In this case, as the electrostatic charge image developer, the electrostatic charge image developer according to the exemplary embodiment is used.

In addition, in the image forming apparatus according to the exemplary embodiment, for example, a portion including the developing unit may have a cartridge structure (process cartridge) which is detachable from the image forming apparatus. As the process cartridge, the process cartridge that contains the electrostatic charge image developer according to the exemplary embodiment and includes the developing unit is preferably used.

The image forming method according to the exemplary embodiment includes a charging process of charging a surface of an image holding member; an electrostatic charge image forming process of forming an electrostatic charge image on the surface of the image holding member; a developing process of forming a toner image by developing the electrostatic charge image using an electrostatic charge image developer; a transfer process of transferring the toner image onto a recording medium; and a fixing process of fixing the toner image on the recording medium. In this case, as the electrostatic charge image developer, the electrostatic charge image developer according to the exemplary embodiment is used.

Hereinafter, an example of the image forming apparatus according to the exemplary embodiment will be described, but does not limit the exemplary embodiment. In addition, main components shown in the drawing will be described, and the descriptions of the other components will be omitted.

FIG. 1 is a diagram schematically illustrating the configuration of a four-tandem color image forming apparatus. The image forming apparatus shown in FIG. 1 includes first to fourth electrophotographic image forming units 10Y, 10M, 10C, and 10K which output images of the respective colors of yellow (Y), magenta (M), cyan (C), and black (K) on the basis of divided color image data. Such image forming units (hereinafter, sometimes simply referred to as "the units") 10Y, 10M, 10C, and 10K are horizontally provided in line at predetermined intervals. The units 10Y, 10M, 10C, and 10K may be process cartridges which are detachable from the image forming apparatus main body.

On the upper side (in the drawing) of the respective units 10Y, 10M, 10C, and 10K, an intermediate transfer belt 20 as an intermediate transfer member extends through the respective units. The intermediate transfer belt 20 is wound around a driving roller 22 and a supporting roller 24 in contact with the inner surface of the intermediate transfer belt 20 and travels in a direction from the first unit 10Y toward the fourth unit 10K, in which the rollers are disposed to be distant from each other in the direction from the left to the right in the drawing. In this case, force is applied to the supporting roller 24 by a spring or the like (not shown) in a direction away from the driving roller 22, and tension is applied to the intermediate transfer belt 20 wounded around both of the rollers. In addition, on the image holding member side of the intermediate transfer belt 20, an intermediate transfer member cleaning device 30 is provided opposite the driving roller 22.

In addition, toners of four colors of yellow, magenta, cyan, and black, which are included in toner cartridges 8Y, 8M, 8C, and 8K, are respectively supplied to developing devices (developing units) 4Y, 4M, 40, and 4K of the respective units 10Y, 10M, 100, and 10K.

Since the first to fourth units 10Y, 10M, 100, and 10K have the same configuration, the first unit 10Y, which is disposed on the upstream side in the travelling direction of the intermediate transfer belt and forms a yellow image, will be described as a representative example. In addition, the same components as those of the first unit 10Y are represented by reference numerals to which the symbols M (magenta), C (cyan), and K (black) are attached instead of the symbol Y (yellow), and the descriptions of the second to fourth units 10M, 100, and 10K, will not be repeated.

The first unit 10Y includes a photoreceptor 1Y which functions as the image holding member. In the vicinity of the photoreceptor 1Y, a charging roller 2Y that charges the surface of the photoreceptor 1Y to a predetermined potential; an exposure device (electrostatic charge image forming unit) 3 that exposes the charged surface to a laser beam 3Y on the basis of divided color image signals to form an electrostatic charge image; the developing device (developing unit) 4Y that supplies charged toner to the electrostatic charge image to develop the electrostatic charge image; a primary transfer roller 5Y (primary transfer unit) that transfers the developed toner image onto the intermediate transfer belt 20; and a photoreceptor cleaning device (cleaning unit) 6Y that removes toner remaining on the surface of the photoreceptor 1Y after the primary transfer are disposed in this order.

In this case, the primary transfer roller 5Y is disposed inside the intermediate transfer belt 20 and opposite the photoreceptor 1Y. Furthermore, bias power supplies (not shown), which apply primary transfer biases, are respectively connected to the primary transfer rollers 5Y, 5M, 5C and 5K. A controller (not shown) controls the respective bias power supplies to change the primary transfer biases which are applied to the respective primary transfer rollers.

Hereinafter, the operation of forming a yellow image in the first unit 10Y will be described. First, prior to the operation, the surface of the photoreceptor 1Y is charged to a potential of about −600 V to about −800 V by the charging roller 2Y.

The photoreceptor 1Y is formed by laminating a photosensitive layer on a conductive substrate (volume resistivity at 20° C.: $1 \times 10^{-6}$ Ωcm or lower). In general, this photosensitive layer has high resistance (resistance similar to that of general resin), and has a property in which, when irradiated with the laser beam 31, the specific resistance of a portion irradiated with the laser beam changes. Therefore, the charged surface of the photoreceptor 11 is irradiated with the laser beam 3Y through the exposure device 3 in accordance with yellow image data which is output from the controller (not shown). The laser beam 3Y is emitted to the photosensitive layer on the surface of the photoreceptor 1Y. As a result, an electrostatic charge image having a yellow printing pattern is formed on the surface of the photoreceptor 1Y.

The electrostatic charge image is an image which is formed on the surface of the photoreceptor 1Y through charging and a so-called negative latent image which is formed through the following processes: the specific resistance of a portion, which is irradiated with the laser beam 3Y, of the photosensitive layer is reduced and electric charge flows on the surface of the photoreceptor 1Y whereas electric charge remains on a portion which is not irradiated with the laser beam 3Y.

The electrostatic charge image which is formed on the photoreceptor 1Y in this way is rotated to a predetermined development position along with the movement of the photoreceptor 1Y. At this development position, the electrostatic charge image on the photoreceptor 1Y is visualized (developed) by the developing device 4Y.

The developing device 4Y contains the electrostatic charge image developer according to the exemplary embodiment which contains at least yellow toner and a carrier, for example. Yellow toner is triboelectrically charged by being agitated in the developing device 4Y, contains electric charge having the same polarity (negative polarity) as that of the electric charge on the photoreceptor 1Y, and is held on a developer roller (developer holding member). As the surface of the photoreceptor 1Y passes through the developing device 4Y, yellow toner is electrostatically attached to a latent image portion, which is erased, on the photoreceptor 1Y. Accordingly, a latent image is developed by the yellow toner. The photoreceptor 1Y on which the yellow toner image is formed travels continuously at a predetermined rate and the toner image which is developed on the photoreceptor 1Y is transported to a predetermined primary transfer position.

When the yellow toner image on the photoreceptor 1Y is transported to the primary transfer position, a primary transfer bias is applied to the primary roller 5Y, electrostatic force from the photoreceptor 1Y to the primary transfer roller 5Y acts on the toner image and the toner image on the photoreceptor 1Y is transferred onto the intermediate transfer belt 20. The transfer bias applied at this time has positive polarity opposite negative polarity of the toner and, for example, in the first unit 10Y, is controlled to about 10 μA by the controller (not shown).

Meanwhile, toner remaining on the photoreceptor 1Y is removed and collected by the cleaning device 61.

In addition, primary transfer biases, which are applied to the primary transfer rollers 5M, 5C, and 5K of the second to fourth units 10M to 10K, are also controlled according to the first unit.

In this way, the intermediate transfer belt 20, onto which the yellow toner image is transferred in the first unit 10Y, sequentially passes through the second to fourth units 10M, 10C, and 10K and toner images of the respective colors are transferred and layered.

The intermediate transfer belt 20, onto which multi-layer four color toner images are transferred by the first to fourth units, arrives at a secondary transfer portion which includes the intermediate transfer belt 20, the supporting roller 24 in contact with the inside of the intermediate transfer belt, and a secondary transfer roller (secondary transfer unit) 26 disposed on the image holding side of the intermediate transfer belt 20. Meanwhile, a recording medium (transfer medium) P is supplied to a nip portion between the secondary transfer roller 26 and the intermediate transfer belt 20 in pressure contact with each other by a supply mechanism at a predetermined timing and a secondary transfer bias is applied to the supporting roller 24. The transfer bias applied at this time has negative polarity, which is the same as negative polarity of the toner. Electrostatic force from the intermediate transfer belt 20 to the recording medium P acts on the toner image and the toner image on the intermediate transfer belt 20 is transferred onto the recording medium P. The secondary transfer bias is determined according to resistance detected by a resistance detection unit (not shown) which detects the resistance of the secondary transfer portion and the voltage is controlled.

Next, the recording medium P is transported to a nip portion between a pair of fixing rollers in the fixing device (roll-shaped fixing unit) 28, the toner images are fixed on the recording medium P, and thus a fixed image is formed.

Examples of the transfer medium onto which the toner images are transferred include plain paper and OHP sheets which are used for electrophotographic copying machines, printers, and the like.

In order to further improve smoothness of the surface of a fixed image, it is preferable that the surface of the transfer medium be also smooth. Therefore, for example, coated paper in which the surface of plain paper is coated with resin or the like; and art paper for printing are preferably used.

The recording medium P on which color images are fixed is transported toward a discharge portion and a series of color image forming operations are finished.

In the above-described example of the image forming apparatus, the toner images are transferred onto the recording medium P through the intermediate transfer belt 20, but the exemplary embodiment is not limited to this configuration. Toner images may be directly transferred onto a recording medium from a photoreceptor.

Process Cartridge and Toner Cartridge

Figure 2:
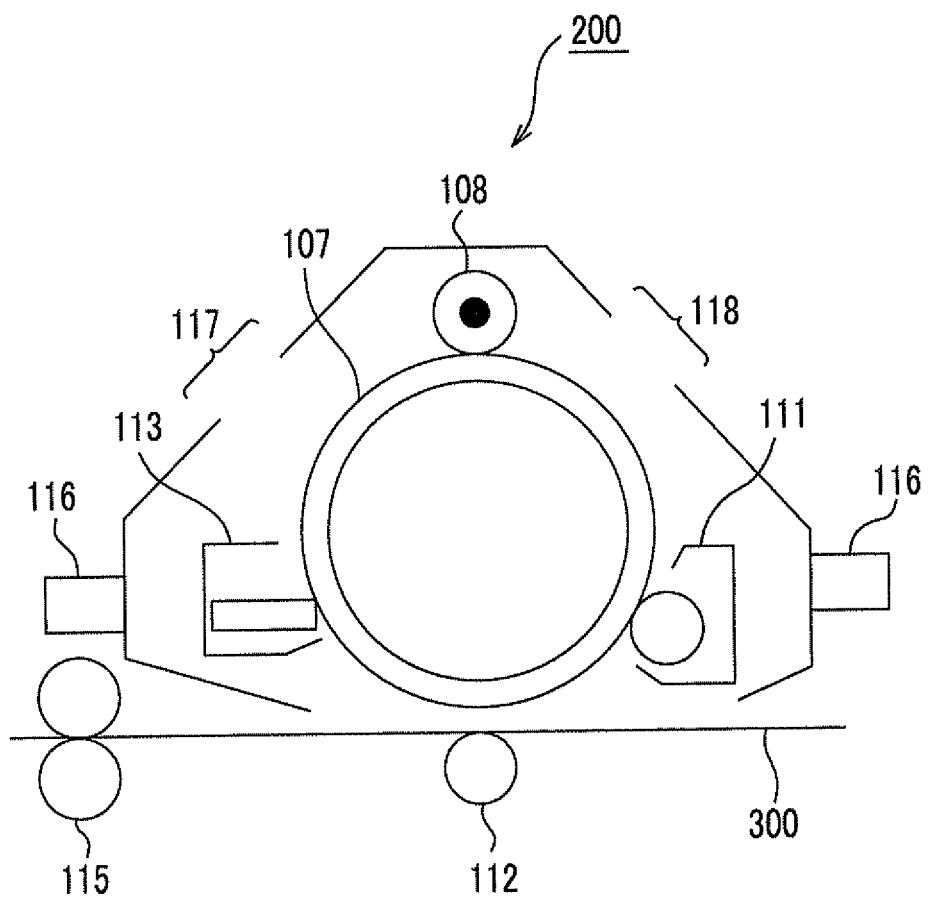
FIG. 2 is a diagram schematically illustrating a configuration example of a process cartridge according to an exemplary embodiment of the invention.

FIG. 2 is a diagram schematically illustrating a preferable configuration example of a process cartridge which contains the electrostatic charge image developer according to an exemplary embodiment. In a process cartridge 200, a photoreceptor 107, a charging roller 108, a developing device 111, a photoreceptor cleaning device 113, an opening 118 for exposure, and an opening 117 for erasing and exposure are combined and integrated through a mounting rail 116. In FIG. 2, reference numeral 300 represents a transfer medium.

This process cartridge 200 is detachable from an image forming apparatus which includes a transfer device 112, a fixing device 115, and other components (not shown).

The process cartridge 200 shown in FIG. 2 includes the charging roller 108, the developing device 111, the cleaning device 113, the opening 118 for exposure, and the opening 117 for erasing and exposure, but these components may be selectively combined. The process cartridge according to the exemplary embodiment includes the photoreceptor 107 and at least one kind selected from a group consisting of the charging roller 108, the developing device 111, the cleaning device (cleaning unit) 113, the opening 118 for exposure, and the opening 117 for erasing and exposure.

Next, a toner cartridge according to the exemplary embodiment will be described. The toner cartridge according to the exemplary embodiment is detachable from an image forming apparatus and contains at least replenishing toner for developing an electrostatic charge image which is supplied to a developing unit provided inside an image forming apparatus.

In FIG. 1, the toner cartridges 8Y, 8M, 8C, and 8K are detachable from the image forming apparatus and the developing devices 4Y, 4M, 4C, and 4K are connected to the toner cartridges corresponding to the respective developing devices (colors) through toner supply tubes (not shown). In addition, when the amount of toner accommodated in a toner cartridge is small, this toner cartridge may be replaced with another one.

EXAMPLES

Hereinafter, the exemplary embodiment will be described in detail with reference to Examples, but the exemplary embodiment is not limited to Examples below. In addition, unless specified otherwise, "part" and "%" represent "part by weight" and "% by weight".

Preparation of Rosin Diol
Synthesis of Rosin Diol (1)

113 parts of bisphenol A diglycidyl ether (trade name: jER828, manufactured by Mitsubishi Chemical Corporation) as a bifunctional epoxy compound, 200 parts of gum rosin, which is purified by distillation (distillation conditions: 6.6 kPa, 220° C.), as a rosin component, and 2 parts of tetraethylammonium bromide (manufactured by TOKYO CHEMICAL INDUSTRY CO., LTD.) as a catalyst are put into a stainless steel reaction vessel, which is equipped with a stirring device, a heating device, a cooling pipe, and a thermometer, and heated to 130° C. Then, a ring-opening reaction of an acid group of the rosin and an epoxy group of the epoxy compound is carried out. The reaction is carried out at the same temperature for 4 hours and stopped when the acid value reaches 0.5 mg KOH/g. As a result, Rosin diol (1) as the exemplary compound is obtained.

Synthesis of Other Rosin Blois

Rosin diols (3), (5), (6), (9), (13), (18), (20), (24), (26), (27), (29), (30), (32), (40), and (41) as the exemplary compound are synthesized in the same synthesis method of Rosin diol (1), except that the kinds and the addition amounts of the bifunctional epoxy compound and the rosin component and the addition amount of the catalyst are changed according to Tables 1 and 2.

TABLE 1

| Rosin Diol (Exemplary Compound No.) | Bifunctional Epoxy Compound (Trade Name)/ Addition Amount (Part By Weight) | Rosin (Kind, Trade Name)/ Addition Amount (Part By Weight) | Catalyst (Trade Name)/ Addition Amount (Part By Weight) |
|---|---|---|---|
| Rosin Diol (1) | Bisphenol A diglycidyl ether (jER828, manufactured by Mitsubishi Chemical Corporation)/113 | Purified Gum rosin/200 | Tetraethylammonium bromide (manufactured by TOKYO CHEMICAL INDUSTRY CO., LTD.)/2 |
| Rosin Diol (3) | Bisphenol F diglycidyl ether/108 | Purified Gum rosin/200 | Tetraethylammonium bromide/2 |
| Rosin Diol (5) | Bisphenol S diglycidyl ether/98 | Purified Gum rosin/200 | Tetraethylammonium bromide/2 |
| Rosin Diol (6) | Tert-butylbenzene diglycidyl ether/142 | Purified Gum rosin/200 | Tetraethylammonium chloride/1.2 |
| Rosin Diol (9) | Ethylene glycol diglycidyl ether/120 | Purified Tall rosin/200 | Tetraethylammonium chloride/1.2 |
| Rosin Diol (13) | Neopentyl diglycidyl ether/102 | Purified Gum rosin/200 | Tetraethylammonium bromide/2 |

TABLE 1-continued

| Rosin Diol (Exemplary Compound No.) | Bifunctional Epoxy Compound (Trade Name)/ Addition Amount (Part By Weight) | Rosin (Kind, Trade Name)/ Addition Amount (Part By Weight) | Catalyst (Trade Name)/ Addition Amount (Part By Weight) |
|---|---|---|---|
| Rosin Diol (18) | Bisphenol A diglycidyl ether/114 | Disproportionated rosin/195 | Tetraethylammonium chloride/1.2 |
| Rosin Diol (20) | Bisphenol F diglycidyl ether/108 | Disproportionated rosin/195 | Tetraethylammonium bromide/2 |
| Rosin Diol (24) | Tert-butylbenzene diglycidyl ether/142 | Disproportionated rosin/195 | Tetraethylammonium bromide/2 |

TABLE 2

| Rosin Diol (Exemplary Compound No.) | Bifunctional Epoxy Compound (Trade Name)/ Addition Amount (Part By Weight) | Rosin (Kind, Trade Name)/ Addition Amount (Part By Weight) | Catalyst (Trade Name)/ Addition Amount (Part By Weight) |
|---|---|---|---|
| Rosin Diol (26) | Ethylene glycol diglycidyl ether/58 | Purified Gum rosin/200 | Tetraethylammonium bromide/3 |
| Rosin Diol (27) | Propylene glycol diglycidyl ether/98 | Disproportionated rosin/200 | Tetraethylammonium chloride/2 |
| Rosin Diol (29) | Neopentyl glycol diglycidyl ether/116 | Disproportionated rosin/200 | Tetraethylammonium chloride/2 |
| Rosin Diol (30) | Ethylene glycol diglycidyl ether/58 | Disproportionated rosin/200 | Tetraethylammonium bromide/3 |
| Rosin Diol (32) | Diethylene glycol diglycidyl ether/87 | Disproportionated rosin/200 | Tetraethylammonium chloride/2 |
| Rosin Diol (40) | Ethylene glycol diglycidyl ether/102 | Hydrogenated rosin/201 | Tetraethylammonium chloride/2 |
| Rosin Diol (41) | Neopentyl glycol diglycidyl ether/116 | Hydrogenated rosin/189 | Tetraethylammonium chloride/2 |

Synthesis of Polyurethane Resin 1

473 parts of Rosin diol (1) as the alcohol component, 217 parts of diphenylmethane-4,4'-diisocyanate (Polymeric MDI, manufactured by Mitsui Chemicals, Inc.) as the isocyanate compound, and 20 ppm of dioctyltin laurate as the catalyst are added, mixed at a temperature of 120° C., rapidly poured into a 200 mm×300 mm tray. The tray is put into an air atmosphere furnace, held at 120° C. for 1 hour, and further held at 130° C. for 5 hours, thereby completing the reaction. As a result, Polyurethane resin 1 is obtained.

2 g of Polyurethane resin 1 is heated in 10 ml of heavy dimethylsulfoxide and 2 ml of heavy methanol solution (7N) of sodium hydroxide at 150° C. for 3 hours and hydrolyzed. Then, heavy water is added thereto, $^1$H-NMR measurement is conducted, and whether the resin is configured as expected or not is examined.

Regarding Polyurethane resin 1 thus obtained, the weight average molecular weight (Mw) is $1.79 \times 10^4$, the number average molecular weight (Mn) is $0.75 \times 10^4$, a value of Mw/Mn is 2.7, Tg is 65° C., and Tm is 129° C.

Synthesis of Polyurethane Resins 2 to 20

Polyurethane resins 2 to 20 are synthesized in the same synthesis method of Polyurethane resin 1, except that the kinds and the addition amounts of the isocyanate compound and the alcohol compound are changed according to Tables 3 and 4.

The measurement results of the weight average molecular weight, the number average molecular weight, the glass transition temperature, and the softening temperature are shown in Tables 3 and 4.

TABLE 3

| Polyurethane Resin | | | 1 | 2 | 3 | 4 | 5 | 6 | 7 | 8 | 9 | 10 |
|---|---|---|---|---|---|---|---|---|---|---|---|---|
| Iso-cyanate Com-pound | Diphenyl-methane-4,4'-diisocyanate | | 217 parts | — | — | 151 parts | 85 parts | 71 parts | 85 parts | 85 parts | 85 parts | 85 parts |
| | Isophorone diisocyanate | | — | 111 parts | 98 parts | — | — | — | — | — | — | — |
| | Hexamethylene diisocyanate | | — | — | 12 parts | — | — | 14 parts | — | — | — | — |
| | Norbornene diisocyanate | | — | — | — | 27 parts | 27 parts | — | 10 parts | 10 parts | 10 parts | 10 parts |
| Alcohol Com-pound | Rosin Diol | | (1) 473 parts | (3) 459 parts | (5) 387 parts | (6) 360 parts | (9) 312 parts | (13) 246 parts | (18) 471 parts | (18) 282 parts | (18) 235 parts | (18) 282 parts |
| | 1,3-Propanediol | | — | — | — | 8 parts | — | — | — | — | — | — |
| | Hexanediol | | — | — | 15 parts | — | — | 31 parts | — | 30 parts | 30 parts | 30 parts |
| | Neopentylglycol | | — | — | — | — | 24 parts | — | — | — | — | — |

TABLE 3-continued

| Polyurethane Resin | 1 | 2 | 3 | 4 | 5 | 6 | 7 | 8 | 9 | 10 |
|---|---|---|---|---|---|---|---|---|---|---|
| Mw (ten thousand) | 1.8 | 1.5 | 2.0 | 2.1 | 1.9 | 1.3 | 1.4 | 2.0 | 2.1 | 2.0 |
| Mn (ten thousand) | 0.75 | 0.45 | 0.51 | 0.54 | 0.41 | 0.50 | 0.88 | 0.75 | 0.65 | 0.61 |
| Glass Transition Temperature (° C.) | 65 | 60 | 51 | 61 | 57 | 51 | 60 | 59 | 50 | 58 |
| Softening Temperature (° C.) | 129 | 121 | 119 | 118 | 111 | 119 | 128 | 129 | 115 | 115 |

TABLE 4

| | Polyurethane Resin | 11 | 12 | 13 | 14 | 15 | 16 | 17 | 18 | 19 | 20 |
|---|---|---|---|---|---|---|---|---|---|---|---|
| Isocyanate Compound | Diphenylmethane-4,4'-diisocyanate | — | — | 85 parts | 85 parts | 85 parts | 89 parts | 75 parts | 84 parts | 75 parts | — |
| | Isophorone diisocyanate | 74 parts | 95 parts | — | — | — | — | — | — | — | — |
| | Hexamethylene diisocyanate | 41 parts | — | — | 5 parts | — | — | — | — | — | 33 parts |
| | Norbornene diisocyanate | — | 15 parts | 11 parts | — | — | — | 13 parts | — | 13 parts | — |
| Alcohol Compound | Rosin Diol | (24) 329 parts | (26) 310 parts | (27) 276 parts | (29) 286 parts | (30) 435 parts | (32) 287 parts | (20) 365 parts | (40) 315 parts | (41) 290 parts | (1) 450 parts |
| | 1,3-Propanediol | — | — | — | 14 parts | — | — | — | — | — | — |
| | 1,2-Propanediol | 8 parts | — | — | — | — | — | 5 parts | — | — | — |
| | Cyclohexane-dimethanol | — | 10 parts | 16 parts | — | — | — | — | 10 parts | — | — |
| | 1,4-benzene dimethanol | — | — | — | — | — | — | — | — | — | — |
| | BPA-EO[1] | — | — | — | — | — | 40 parts | — | — | 40 parts | — |
| | BRA-PO[2] | — | — | — | — | — | 23 parts | — | — | 23 parts | — |
| Mw (ten thousand) | | 5.2 | 4.1 | 2.1 | 1.9 | 2.2 | 2.2 | 4.6 | 7.5 | 8.1 | 8.9 |
| Mn (ten thousand) | | 0.45 | 0.15 | 0.12 | 0.40 | 0.36 | 0.33 | 0.68 | 0.59 | 0.84 | 0.55 |
| Acid Value (mg KOH/g) | | 12.0 | 12.2 | 12.2 | 13.5 | 14.5 | 12.0 | 11.5 | 10.2 | 12.7 | 13.1 |
| Glass Transition Temperature (° C.) | | 58 | 55 | 56 | 60 | 63 | 56 | 55 | 56 | 54 | 59 |
| Softening Temperature (° C.) | | 118 | 114 | 115 | 120 | 124 | 115 | 114 | 115 | 113 | 120 |

[1]Ethylene oxide (2 mole) adducts of bisphenol A
[2]Propylene oxide (2 mole) adducts of bisphenol A Example 1

Toner Particles 1

A mixture described below is kneaded in an extruder and pulverized with a surface-pulverization type pulverizer. Then, coarse particles and fine particles are classified with a wind-force classifier (Turbo Classifier TC-15N, manufactured by Nisshin Engineering Inc.) and a process of obtaining intermediate-sized particles is repeated three times. As a result, magenta Toner particles 1 having a volume average particle size of 6.5 μm are obtained.
Composition of Mixture
Polyurethane resin 1 100 parts by weight
Magenta pigment (C.I. Pigment Blue 15) 3 parts by weight
Carnauba wax (manufactured by TOAGOSEI CO., LTD.) 8 parts by weight
Toner
0.5 part by weight of silica (trade name: 8972, manufactured by Nippon Aerosil Co., Ltd.) is added to Toner particles 1 (100 parts by weight) and mixed using a high-speed mixer to obtain a toner.
Developer
The toner obtained above and a carrier, which is formed of ferrite particles with a particle size of 50 μm coated with methyl methacrylate-styrene copolymer, are used. 7 parts of the toner is added to 100 parts of the carrier and mixed using a tumbler shaker mixer. As a result, a developer is obtained. In this case, environment conditions at the time of mixing the toner and the carrier are set to a summer environment (30° C., relative humidity: 85%) and a winter environment (5° C., relative humidity: 10%).
Evaluation of Fixing Property
A fixing property is evaluated as follows: a color laser printer (DCP1616, manufactured by Fuji Xerox Co., Ltd.) is modified; an image for evaluating a fixing property is fixed under conditions of a nip width of 8 mm and a transit time of 50 msec; and when the image is formed, a temperature range where offset does not occur (non-offset range) and a temperature range where the fix level is satisfactory (satisfactory fix level range) are examined.

In a fixing operation, a modified fixing unit is used, in which a fixing unit including a heating roller is detached from an image forming apparatus and is separately driven by an external driving device such that the fixing nip time may be adjusted. In addition, the fixing unit is modified such that the surface temperature of a roller (fixing roller) on the side contacting a toner image on paper is controlled from 100° C. to 200° C.

The image for evaluating a fixing property is a so-called solid image in which toner is attached to a 20 mm² area at a position 10 mm distant from a leading end of paper (manufactured by Fuji Xerox Office Supply co., Ltd., "P paper"). In this case, the amount of toner deposited is 0.4 mg/cm².
Non-Offset Range
The non-offset range is evaluated as follows: while changing the surface temperature of the fixing roller in a stepwise manner, an unfixed image is passed through a fixing roller, the image or a portion thereof is transferred onto a fixing roller, and subsequently whether the image or the portion thereof is transferred onto the subsequent paper or not is determined by visual inspection.

A case where the image or the portion thereof is transferred onto paper is determined as offset and a case where the image or the portion thereof is not transferred onto paper is determined as non-offset. The non-offset ranges on a low-temperature side and on a high-temperature side are obtained.

The evaluation criteria are as follows.
Evaluation of Non-Offset Range on Low-temperature Side
120° C. or lower: A
150° C. or lower: B
160° C. or lower: C
A and B are considered allowable.
Evaluation of Non-Offset Range on High-temperature Side
220° C. or higher: A
200° C. or higher: B
190° C. or lower: C
180° C. or lower: D
A and B are considered allowable.
Satisfactory Fix Level Range The satisfactory fix level range is evaluated as follows: after examining the non-offset range, an image fixed at 160° C. is rubbed five times with an eraser (a sand eraser "LION 261-11", manufactured by LION OFFICE PRODUCTS CORP.) under a pressing load of 1 Kgf, and the residual ratio of the image density is measured and calculated using "X-Rite model 404" (manufactured by X-Rite Inc.), The evaluation criteria are as follows.
70% or less: D
70% to 80%: C
90% or more: B
95% or more: A
A and B are considered allowable.

Examples 2 to 4

Toner particles 2 to 4 are obtained in the same preparation method as that of Example 1, except that Polyurethane resin 1 and cyan pigment (C.I. Pigment Blue 15) are changed to polyurethane resins and pigments shown in Table 5 below. Then, using Toner particles 2 to 4 obtained above, toners and developers are prepared. Then, fixing properties are evaluated in the same method as that of Example 1. The evaluation results of the fixing properties are shown in Table 6.

TABLE 5

| | Toner Particles | Polyurethane Resin | Pigment |
|---|---|---|---|
| Example 2 | 2 | 2 | Carbon black (Mogul L, manufactured by Cabot Corporation) |
| Example 3 | 3 | 3 | Magenta Pigment (Pigment Red 57) |
| Example 4 | 4 | 4 | Dis-azo yellow; C.I. Pigment Yellow 12 |

Examples 5 to 20

Toner particles 5 to 20 are obtained in the same preparation method as that of Example 1, except that Polyurethane resin 1 is changed to Polyurethane resins 5 to 20. Then, using Toner particles 5 to 20 obtained above, toners and developers are prepared. Then, fixing properties are evaluated in the same method as that of Example 1. The evaluation results of the fixing properties are shown in Table 6.

Comparative Example 1

Comparative Toner Particles 1

A mixture described below is pulverized and classified in the same method as that of Example 1. As a result, Comparative toner particles 1 of magenta having a volume average particle size of 6.2 μm are obtained.
Composition of Mixture
  Comparative polyester resin A (terephthalic acid/ethylene oxide adducts of bisphenol A/cyclohexanedimethanol=83 parts/162 parts/14 parts; glass transition temperature: 60° C.; Mw: 15,000; Mn: 2,100; acid value: 12 mg KOH/g; and softening temperature: 120° C.): 100 parts by weight
  Magenta Pigment (C.I. Pigment Red 57): 3 parts by weight
  Wax (HNP0190, manufactured by NIPPON SERIO CO., LTD.): 8 parts by weight
Preparation of Comparative Polyester Resin A The above-described monomers of Comparative polyester resin A are put into a reaction vessel which is equipped with a stirring device and a cooling pipe, are heated to 230° C., and dissolved while nitrogen gas is introduced. Then, a tin-based catalyst (0.2 part of dibutyltin oxide) which is a polycondensation catalyst is added thereto and the resultant is heated to 250° C. over 2 hours. Next, the pressure in the system is reduced (20 mmHg) and polycondensation is performed. As a result, Comparative polyester resin A is obtained.
Toner and Developer Using Comparative toner particles 1, a toner and a carrier are obtained in the same method as that of Example 1. Next, the fixing property is evaluated in the same method as that of Example 1. The evaluation result of the fixing property is shown in Table 6.

Comparative Example 2

Comparative Toner Particles 2

A mixture described below is pulverized and classified in the same method as that of Example 1. As a result, magenta Comparative toner particles 2 having a volume average particle size of 5.9 μm are obtained.
Composition of Mixture
  Comparative polyurethane resin B (prepared in a preparation method below): 90.0 parts by weight
  Cyan pigment (C.I. Pigment Blue 15:3): 5.0 parts by weight
  Carnauba wax (manufactured by TOAGOSEI CO., LTD.) 5.0 parts by weight
Preparation of Comparative Polyester Resin B Diphenylmethane-4,4'-diisocyanate as the isocyanate component and a mixture of polyoxyethylene bisphenol A ether (Uniol DA-400 (manufactured by NOF CORPORATION, OH group value=273 KOH mg/g): 1,3-propanediol=50:50 (mole ratio)) are heated to 120° C. and dissolved. As a result, Comparative polyurethane resin B is obtained.

The isocyanate component and the polyol component are mixed at an equivalent ratio of 1:1.15 (Isocyanate Component:Polyol Component) and 20 ppm of dioctyltin laurate as a catalyst is added thereto. The resultant is mixed while heated at a temperature of 120° C. and rapidly poured into a 200 mm×300 mm tray. The tray is put into an air atmosphere furnace, held at 120° C. for 1 hour, and further held at 130° C.

for 5 hours, thereby completing the reaction. As a result, Comparative polyurethane resin B is obtained.

Regarding Comparative polyurethane resin B thus obtained, the weight average molecular weight (Mw) is $2.5 \times 10^4$, the number average molecular weight (Mn) is $0.55 \times 10^4$, Tg is 69° C., and Tm is 132° C.

Toner and Developer

Using Comparative toner particles 2, a toner and a carrier are obtained in the same method as that of Example 1. Next, the fixing property is evaluated in the same method as that of Example 1. The evaluation result of the fixing property is shown in Table 6.

Example 21

Toner Particles 21
Preparation of Resin Particle Dispersion (a) using Polyurethane Resin 1

0.5 part, of soft type sodium dodecylbenzenesulfonate as a surfactant is added to Polyurethane resin 1 (100 parts) and 300 parts of ion exchange water is further added thereto. The resultant is mixed and dispersed in a round glass flask using a homogenizer (manufactured by IKA Japan K.K, ULTRA-TURRAX T50) while being heated to 80° C. Then, using 0.5 mole/liter of aqueous sodium hydroxide solution, the pH value in the system is adjusted to 5.0. The resultant is heated to 95° C. while stirring using the homogenizer is continued. As a result, Resin particle dispersion (a) having resin particles with a mean particle size of 150 nm and a solid content of 20% is obtained.

Preparation of Resin Particle Dispersion (b)

0.5 part of soft type sodium dodecylbenzenesulfonate as a surfactant is added to Polyurethane resin 2 (100 parts) and 300 parts of ion exchange water is further added thereto. The resultant is mixed and dispersed in a round glass flask using a homogenizer (manufactured by IKA Japan K.K, ULTRA-TURRAX T50) while being heated to 80° C. Then, using 0.5 mole/liter of aqueous sodium hydroxide solution, the pH value in the system is adjusted to 5.0. The resultant is heated to 95° C. while stirring using the homogenizer is continued. As a result, Resin particle dispersion (b) having resin particles with a mean particle size of 175 nm and a solid content of 20% is obtained.

Preparation of Colorant Particle Dispersion (P1)
Cyan pigment (manufactured by Dainichiseika Color & Chemicals Mfg. Co., Ltd., copper phthalocyanine, C.I. Pigment Blue 15:3): 50 parts by weight
Anionic surfactant (manufactured by DAT-ICHI KOGYO SEIYAKU CO., LTD., NEOGEN R): 5 parts by weight
Ion exchange water: 200 parts by weight The above components are mixed and dissolved, and dispersed for 5 minutes using a homogenizer (manufactured by IKA Japan K.K, ULTRA-TURRAX T50) and dispersed for 10 minutes in an ultrasonic bath. As a result, Colorant particle dispersion (P1) having colorant particles with a mean particle size of 190 nm and a solid content of 20% is obtained.

Preparation of Release agent Particle Dispersion (W1)
Dodecyl sulfate: 30 parts by weight
Ion exchange water: 852 parts by weight The above components are mixed and an aqueous dodecyl sulfate solution is prepared.
Palmitic acid: 188 parts by weight
Pentaerythritol: 25 parts by weight In addition to the aqueous dodecyl sulfate solution, the above components are mixed, heated to 250° C. and dissolved. The resultant is added to the aqueous dodecyl sulfate solution, emulsified for 5 minutes using a homogenizer (manufactured by IKA Japan K.K, ULTRA-TURRAX T50), and further emulsified for 15 minutes in an ultrasonic bath. The emulsion is put into a flask and held at 70° C. for 15 hours under stirring.

As a result, Release agent particle dispersion (W1) having release agent particles with a mean particle size of 200 nm, a melting temperature of 72° C. and a solid content of 20% is obtained.

Preparation of Toner Particles 21
Resin particle dispersion (a): 100 parts by weight
Resin particle dispersion (b): 300 parts by weight
Colorant particle dispersion (21): 50 parts by weight
Release agent particle dispersion (W1): 50 parts by weight
Polyaluminum chloride: 0.15 part by weight
Ion exchange water: 300 parts by weight The above components are put into a round stainless steel flask, mixed and dispersed using a homogenizer (manufactured by IKA Japan K.K, ULTRA-TURRAX T50), heated to 42° C. in a heating oil bath under stirring, and held at 42° C. for 60 minutes.

Then, using 0.5 mole/liter of aqueous sodium hydroxide solution, the pH value in the system is adjusted to 6.0. The resultant is heated to 95° C. while stirring is continued.

While the resultant is heated to 95° C., the pH value in the system is generally reduced to 5.0 or lower. However, in the exemplary embodiment, by further adding the aqueous sodium hydroxide dropwise, the pH value is maintained to be higher than 5.5.

After the reaction is stopped, the resultant is cooled and filtrated. The filtrate is sufficiently washed with ion exchange water, followed by solid-liquid separation with Nutsche suction filtration. Then, the resultant is dispersed again in 3 liters of ion exchange water at 40° C., stirred for 15 minutes at 300 rpm, and washed. The above washing process is repeated five times, followed by solid-liquid separation with Nutsche suction filtration and vacuum drying for 12 hours. As a result, Toner particles 21 are obtained.

When the volume average particle size of Toner particles 21 is measured in the above-described method, the cumulative volume average particle size $D_{50}$ is 5.6 μm and the volume average particle size distribution index $GSD_v$ is 1.21. In addition, the shape factor SF1 of Toner particles 21 is 130 when measured in the above-described method.

Using Toner particles 21, a toner and a carrier is obtained in the same method as that of Example 1. Next, the fixing property is evaluated in the same method as that of Example 1. The evaluation result of the fixing property is shown in Table 6.

TABLE 6

| | Fixing Property | | |
| --- | --- | --- | --- |
| | (1) Non-Offset Range on Low-temperature Side | (2) Non-Offset Range on High-temperature Side | Residual Ratio of Image Density |
| Example 1 | A | B | A |
| Example 2 | A | B | B |
| Example 3 | A | B | A |
| Example 4 | A | B | B |
| Example 5 | A | A | B |
| Example 6 | A | A | B |
| Example 7 | A | B | A |
| Example 8 | B | B | B |
| Example 9 | A | B | B |
| Example 10 | B | A | A |
| Example 11 | A | A | B |
| Example 12 | B | B | B |
| Example 13 | A | B | A |
| Example 14 | B | B | B |

TABLE 6-continued

| | Fixing Property | | |
|---|---|---|---|
| | (1) Non-Offset Range on Low-temperature Side | (2) Non-Offset Range on High-temperature Side | Residual Ratio of Image Density |
| Example 15 | B | B | B |
| Example 16 | A | B | A |
| Example 17 | B | A | B |
| Example 18 | B | B | A |
| Example 19 | A | B | B |
| Example 20 | B | B | B |
| Example 21 | B | B | B |
| Comparative Example 1 | C | C | D |
| Comparative Example 2 | C | D | D |

As shown in the above results, it is apparent that, according to Examples, the fix level of an image fixed on a recording medium is improved while offset resistance is maintained, as compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A toner for developing an electrostatic charge image comprising a polyurethane resin which is an addition polymer, the polyurethane resin comprising:
   an isocyanate compound containing at least a compound having two or more isocyanate groups; and
   an alcohol compound containing rosin diol represented by Formula (1):

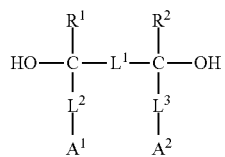

(1)

wherein in Formula (1):
R$^1$ and R$^2$ represent a hydrogen atom or a methyl group,
L$^1$, L$^2$, and L$^3$ each independently represent a member selected from the group consisting of a carbonyl group, an ester group, an ether group, a sulfonyl group, a chain alkylene group which may have a substituent, a cyclic alkylene group which may have a substituent, an arylene group which may have a substituent, and a divalent linking group selected from a group consisting of combinations of the above-described groups, wherein L$^1$ and L$^2$ or L$^1$ and L$^3$ may form a ring together, and
A$^1$ and A$^2$ represent a rosin ester group.

2. The toner according to claim 1, wherein the rosin diol represented by Formula (1) is a reaction product of a bifunctional epoxy compound and rosin.

3. The toner according to claim 1, wherein the compound having two or more isocyanate groups is at least one selected from a group consisting of aromatic diisocyanate compounds and cyclic aliphatic diisocyanate compounds.

4. The toner according to claim 2, wherein the compound having two or more isocyanate groups is at least one selected from a group consisting of aromatic diisocyanate compounds and cyclic aliphatic diisocyanate compounds.

5. The toner according to claim 1, wherein the compound having two or more isocyanate groups is a chain aliphatic diisocyanate compound.

6. The toner according to claim 2, wherein the compound having two or more isocyanate groups is a chain aliphatic diisocyanate compound.

7. An electrostatic charge image developer comprising the toner for developing an electrostatic charge image according to claim 1.

8. A toner cartridge which is detachable from an image forming apparatus, comprising the toner for developing an electrostatic charge image according to claim 1.

9. A process cartridge which is detachable from an image forming apparatus, comprising:
   the electrostatic charge image developer according to claim 8; and
   a developing unit that forms a toner image by developing an electrostatic charge image, which is formed on a surface of an image holding member, using the electrostatic charge image developer.

10. An image forming apparatus comprising:
   an image holding member;
   a charging unit that charges a surface of the image holding member;
   an electrostatic charge image forming unit that forms an electrostatic charge image on the surface of the image holding member;
   a developing unit that contains the electrostatic charge image developer according to claim 8 and forms a toner image by developing the electrostatic charge image using the electrostatic charge image developer;
   a transfer unit that transfers the toner image onto a recording medium; and
   a fixing unit that fixes the toner image on the recording medium.

11. An image forming method comprising:
   charging a surface of an image holding member;
   forming an electrostatic charge image on the surface of the image holding member;
   forming a toner image by developing the electrostatic charge image using the electrostatic charge image developer according to claim 8;
   transferring the toner image onto a recording medium; and
   fixing the toner image on the recording medium.

* * * * *